(12) United States Patent
Yeh et al.

(10) Patent No.: US 12,174,349 B2
(45) Date of Patent: Dec. 24, 2024

(54) IMAGING OPTICAL LENS SYSTEM INCLUDING EIGHT LENSES OF +−+−−++−, +−+−+−+−, +−+++−+− OR +−+−−−+− REFRACTIVE POWERS, IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 485 days.

(21) Appl. No.: 17/506,391

(22) Filed: Oct. 20, 2021

(65) Prior Publication Data
US 2022/0382018 A1    Dec. 1, 2022

(30) Foreign Application Priority Data
May 14, 2021 (TW) .................................. 110117397

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 9/64; G02B 13/0045
See application file for complete search history.

(56) References Cited

U.S. PATENT DOCUMENTS

| | | |
|---|---|---|
| 2017/0045714 A1 | 2/2017 | Huang |
| 2020/0201000 A1 | 6/2020 | Hseih et al. |
| 2020/0393653 A1 | 12/2020 | Chen |
| 2021/0018729 A1 | 1/2021 | Li et al. |
| 2021/0055520 A1 | 2/2021 | Yan et al. |
| 2021/0157092 A1 | 5/2021 | Chen et al. |

(Continued)

FOREIGN PATENT DOCUMENTS

| | | |
|---|---|---|
| CN | 108873272 A | 11/2018 |
| CN | 110471168 A | 11/2019 |
| CN | 111007622 A | 4/2020 |

(Continued)

OTHER PUBLICATIONS

TW Office Action dated Aug. 25, 2021 as received in Application No. 110117397.

(Continued)

*Primary Examiner* — Wen Huang
(74) *Attorney, Agent, or Firm* — Maschoff Brennan

(57) ABSTRACT

An imaging optical lens system includes eight lens elements which are, in order from an object side to an image side along an optical path: a first lens element, a second lens element, a third lens element, a fourth lens element, a fifth lens element, a sixth lens element, a seventh lens element and an eighth lens element. The first lens element has positive refractive power. The second lens element has negative refractive power. The seventh lens element has an image-side surface being concave in a paraxial region thereof, and the image-side surface of the seventh lens element has at least one convex critical point in an off-axis region thereof.

21 Claims, 28 Drawing Sheets

(56) References Cited

U.S. PATENT DOCUMENTS

2021/0181478 A1   6/2021   Wang

FOREIGN PATENT DOCUMENTS

| | | | |
|---|---|---|---|
| CN | 111007628 | A | 4/2020 |
| CN | 111007631 | A | 4/2020 |
| CN | 111007635 | A | 4/2020 |
| CN | 111007637 | A | 4/2020 |
| CN | 111025555 | A | 4/2020 |
| CN | 111077643 | A | 4/2020 |
| CN | 111142223 | A | 5/2020 |
| CN | 111142224 | A | 5/2020 |
| CN | 111352219 | A | 6/2020 |
| CN | 111474681 | A | 7/2020 |
| CN | 211786316 | U | 10/2020 |
| TW | 202045973 | A | 12/2020 |
| TW | I714368 | A | 12/2020 |
| TW | I714368 | B | 12/2020 |
| TW | I725714 | B | 4/2021 |
| WO | 2021201568 | A1 | 10/2021 |

OTHER PUBLICATIONS

European Office Action dated Apr. 13, 2022 as received in application No. 21207383.7.
European Search Report dated Jun. 26, 2024 in application No. 24166998.5.

IMAGING OPTICAL LENS SYSTEM INCLUDING EIGHT LENSES OF +−+−−++−, +−+−+−+−, +−+++−+− OR +−+−−−+− REFRACTIVE POWERS, IMAGE CAPTURING UNIT AND ELECTRONIC DEVICE

RELATED APPLICATIONS

This application claims priority to Taiwan Application 110117397, filed on May 14, 2021, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element.

The first lens element has positive refractive power. The second lens element has negative refractive power. The seventh lens element has an image-side surface being concave in a paraxial region thereof, and the image-side surface of the seventh lens element has at least one convex critical point in an off-axis region thereof.

When an Abbe number of the third lens element is V3, an Abbe number of the fifth lens element is V5, an Abbe number of the sixth lens element is V6, a focal length of the seventh lens element is f7, a focal length of the eighth lens element is f8, a curvature radius of an object-side surface of the eighth lens element is R15, and a curvature radius of an image-side surface of the eighth lens element is R16, the following condition is satisfied:

$30 < V6 < 50;$ $85 < V3+V5;$ $|f7/f8| < 25;$ and $|R16/R15| < 1.60.$

According to one aspect of the present disclosure, an imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element.

The first lens element has positive refractive power. The second lens element has negative refractive power. The seventh lens element has an image-side surface being concave in a paraxial region thereof, and the image-side surface of the seventh lens element has at least one convex critical point in an off-axis region thereof.

When an Abbe number of the third lens element is V3, an Abbe number of the fifth lens element is V5, an Abbe number of the sixth lens element is V6, a focal length of the seventh lens element is f7, a focal length of the eighth lens element is f8, an axial distance between the fourth lens element and the fifth lens element is T45, and an axial distance between the seventh lens element and the eighth lens element is T78, the following condition is satisfied:

$30 < V6 < 50;$ $85 < V3+V5;$ $|f7/f8| < 4.0;$ and $T78/T45 < 5.0.$

According to another aspect of the present disclosure, an image capturing unit includes one of the aforementioned imaging optical lens systems and an image sensor, wherein the image sensor is disposed on an image surface of the imaging optical lens system.

According to another aspect of the present disclosure, an electronic device includes at least two image capturing units disposed on the same side of the electronic device. The at least two image capturing units include a first image capturing unit and a second image capturing unit. The first image capturing unit includes one of the aforementioned imaging optical lens systems and an image sensor disposed on an image surface of the imaging optical lens system. The second image capturing unit includes an optical lens assembly and an image sensor disposed on an image surface of the optical lens assembly. A maximum field of view of the first image capturing unit and a maximum field of view of the second image capturing unit differ by at least 20 degrees.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element.

The first lens element has positive refractive power. Therefore, it is favorable for the miniaturization of the imaging optical lens system.

The second lens element has negative refractive power. Therefore, it is favorable for balancing aberrations generated by the first lens element so as to correct spherical aberration and chromatic aberration.

The sixth lens element can have negative refractive power. Therefore, it is favorable for correcting aberrations generated at the image side of the imaging optical lens system.

Figure 24:
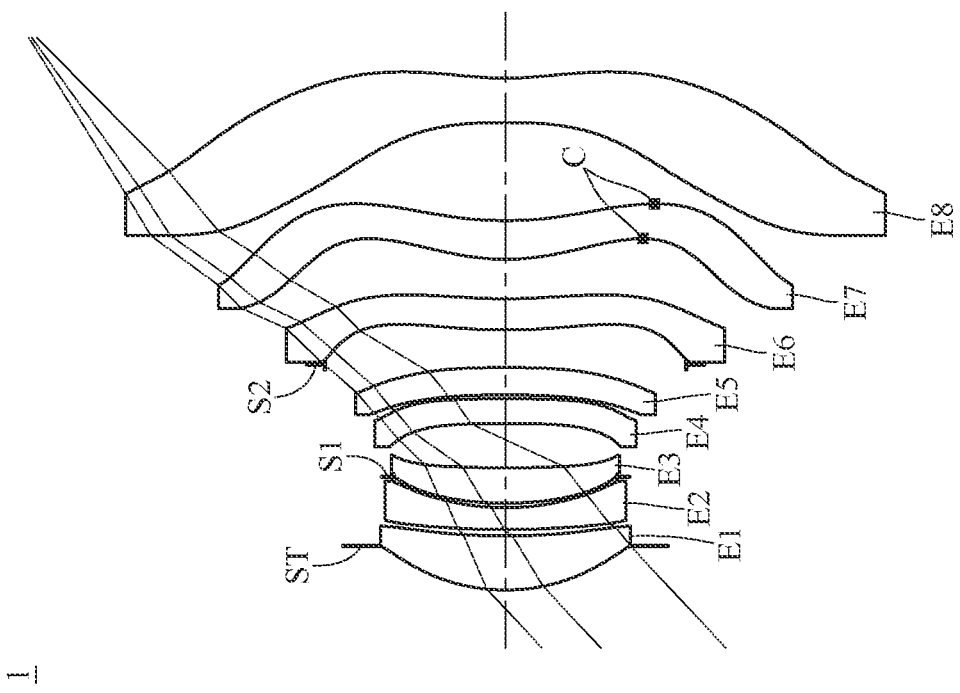
FIG. 24 shows a schematic view of critical points of the seventh lens element according to the 1 st embodiment of the present disclosure.

The seventh lens element can have positive refractive power. Therefore, it is favorable for the distribution of positive refractive power of the imaging optical lens system, so as to reduce the sensitivity of lens elements and the size of the imaging optical lens system. The seventh lens element can have an object-side surface being convex in a paraxial region thereof. Therefore, it is favorable for enhancing the refractive power of the seventh lens element so as to reduce the total track length of the imaging optical lens system, thereby achieving compactness. The seventh lens element has an image-side surface being concave in a paraxial region thereof. Therefore, it is favorable for adjusting the travelling direction of light at the image side of the imaging optical lens system. The object-side surface of the seventh lens element can have at least one concave critical point in an off-axis region thereof. Therefore, it is favorable for the object-side surface of the seventh lens element to adjust the travelling direction of light incident on the seventh lens element so as to correct off-axis aberrations. The image-side surface of the seventh lens element has at least one convex critical point in an off-axis region thereof. Therefore, it is favorable for utilizing the combination of the seventh lens element and the eighth lens element so as to enhance the convergence of off-axis light rays, thereby improving peripheral image resolution. Please refer to FIG. 24, which shows a schematic view of non-axial critical points C of the seventh lens element E7 according to the 1st embodiment of the present disclosure. The non-axial critical points C of the seventh lens element E7 in FIG. 24 are only exemplary. Each of the lens elements in various embodiments of the present disclosure can have one or more non-axial critical points.

The eighth lens element can have negative refractive power. Therefore, it is favorable for the eighth lens element to control the travelling direction of light at the image side of the imaging optical lens system so as to balance the back focal length and the angle of incidence on the image sensor.

When an Abbe number of the sixth lens element is V6, the following condition is satisfied: 30<V6<50. Therefore, it is favorable for correcting chromatic aberration of the sixth lens element.

When an Abbe number of the third lens element is V3, and an Abbe number of the fifth lens element is V5, the following condition is satisfied: 85<V3+V5. Therefore, it is favorable for balancing the chromatic aberration at the object side and image side of the imaging optical lens system. Moreover, the following condition can also be satisfied: 100<V3+V5<150.

When a focal length of the seventh lens element is f7, and a focal length of the eighth lens element is f8, the following condition is satisfied: |f7/f8|<25. Therefore, it is favorable for ensuring the lens elements at the image side with sufficient refractive power so as to control the size of the imaging optical lens system. Moreover, the following condition can also be satisfied: |f7/f8|<4.0. Moreover, the following condition can also be satisfied: |f7/f8|<2.0.

When a curvature radius of an object-side surface of the eighth lens element is R15, and a curvature radius of an image-side surface of the eighth lens element is R16, the following condition can be satisfied: |R16/R15|<1.60.

Therefore, it is favorable for adjusting the surface shape of the eighth lens element so as to improve image quality. Moreover, the following condition can also be satisfied: |R16/R15|<1.0. Moreover, the following condition can also be satisfied: |R16/R15|<0.5.

When an axial distance between the fourth lens element and the fifth lens element is T45, and an axial distance between the seventh lens element and the eighth lens element is T78, the following condition can be satisfied: T78/T45<5.0. Therefore, it is favorable for ensuring sufficient space between the seventh lens element and the eighth lens element, so as to obtain higher design flexibility of the lens surfaces of the seventh and eighth lens elements with larger curvature variation. Moreover, the following condition can also be satisfied: T78/T45<4.0.

When an Abbe number of the first lens element is V1, and the Abbe number of the sixth lens element is V6, the following condition can be satisfied: 1.35<V1/V6<1.95. Therefore, it is favorable for correcting chromatic aberration.

When a sum of axial distances between each of all adjacent lens elements of the imaging optical lens system is ΣAT, and the axial distance between the seventh lens element and the eighth lens element is T78, the following condition can be satisfied: ΣAT/T78<2.50. Therefore, it is favorable for ensuring sufficient space between the seventh lens element and the eighth lens element, so that the shapes of the seventh and eighth lens elements are favorable for manufacturing.

When a maximum image height of the imaging optical lens system (which can be half of a diagonal length of an effective photosensitive area of an image sensor) is ImgH, and an axial distance between the image-side surface of the eighth lens element and an image surface is BL, the following condition can be satisfied: 5.2<ImgH/BL. Therefore, it is favorable for reducing the back focal length, so as to properly utilize the limited space in the imaging optical lens system. Moreover, the following condition can also be satisfied: 5.8<ImgH/BL.

When an axial distance between an object-side surface of the first lens element and an image-side surface of the fourth lens element is Dr1r8, and an axial distance between an object-side surface of the fifth lens element and the image-side surface of the eighth lens element is Dr9r16, the following condition can be satisfied: 1.75<Dr9r16/Dr1r8. Therefore, it is favorable for enhancing space utilization of the imaging optical lens system by preventing overly small or overly large spacing between the lens elements. Moreover, the following condition can also be satisfied: 1.90<Dr9r16/Dr1 r8<3.50.

When the axial distance between the seventh lens element and the eighth lens element is T78, and the axial distance between the image-side surface of the eighth lens element and the image surface is BL, the following condition can be satisfied: 0.95<T78/BL. Therefore, it is favorable for ensuring sufficient space on two sides of the eighth lens element, so that the shape of the eighth lens element is favorable for manufacturing.

When a refractive index of the sixth lens element is N6, and the Abbe number of the sixth lens element is V6, the following condition can be satisfied: 19<V6/N6<29. Therefore, it is favorable for correcting chromatic aberration of the sixth lens element. Moreover, the following condition can also be satisfied: 22<V6/N6<27.

When the Abbe number of the sixth lens element is V6, a maximum value among Abbe numbers of all lens elements of the imaging optical lens system is Vmax, and a minimum value among Abbe numbers of all lens elements of the imaging optical lens system is Vmin, the following condition can be satisfied: 0.75<V6/(Vmax−Vmin)<1.5. Therefore, it is favorable for further correcting chromatic aberration of the sixth lens element. Moreover, the following condition can also be satisfied: 0.80<V6/(Vmax−Vmin) <1.25. Moreover, the following condition can also be satisfied: 0.90<V6/(Vmax−Vmin)<1.25.

When a focal length of the imaging optical lens system is f, a curvature radius of an object-side surface of one lens element of the imaging optical lens system is Ro, and a curvature radius of an image-side surface of the one lens element is Ri, at least one lens element of the imaging optical lens system can satisfy the following condition: f/|Ro|+f/|Ri|<0.80. Therefore, it is favorable for preventing stray light generated due to surface reflection caused by having too many lens elements with large curvature in the imaging optical lens system.

Moreover, at least one lens element of the imaging optical lens system can also satisfy the following condition: f/|Ro|+f/|Ri|<0.60. Moreover, at least one of the third lens element, the fourth lens element, the fifth lens element and the sixth lens element of the imaging optical lens system can also satisfy the following condition: f/|Ro|+f/|Ri|<0.80.

When an axial distance between the object-side surface of the first lens element and the image surface is TL, and the maximum image height of the imaging optical lens system is ImgH, the following condition can be satisfied: TL/ImgH<1.40. Therefore, it is favorable for reducing the total track length, so as to better utilize the limited space in the imaging optical lens system.

When an f-number of the imaging optical lens system is Fno, the following condition can be satisfied: 1.20<Fno<2.20. Therefore, it is favorable for balancing illumination and depth of field of the imaging optical lens system.

Figure 25:
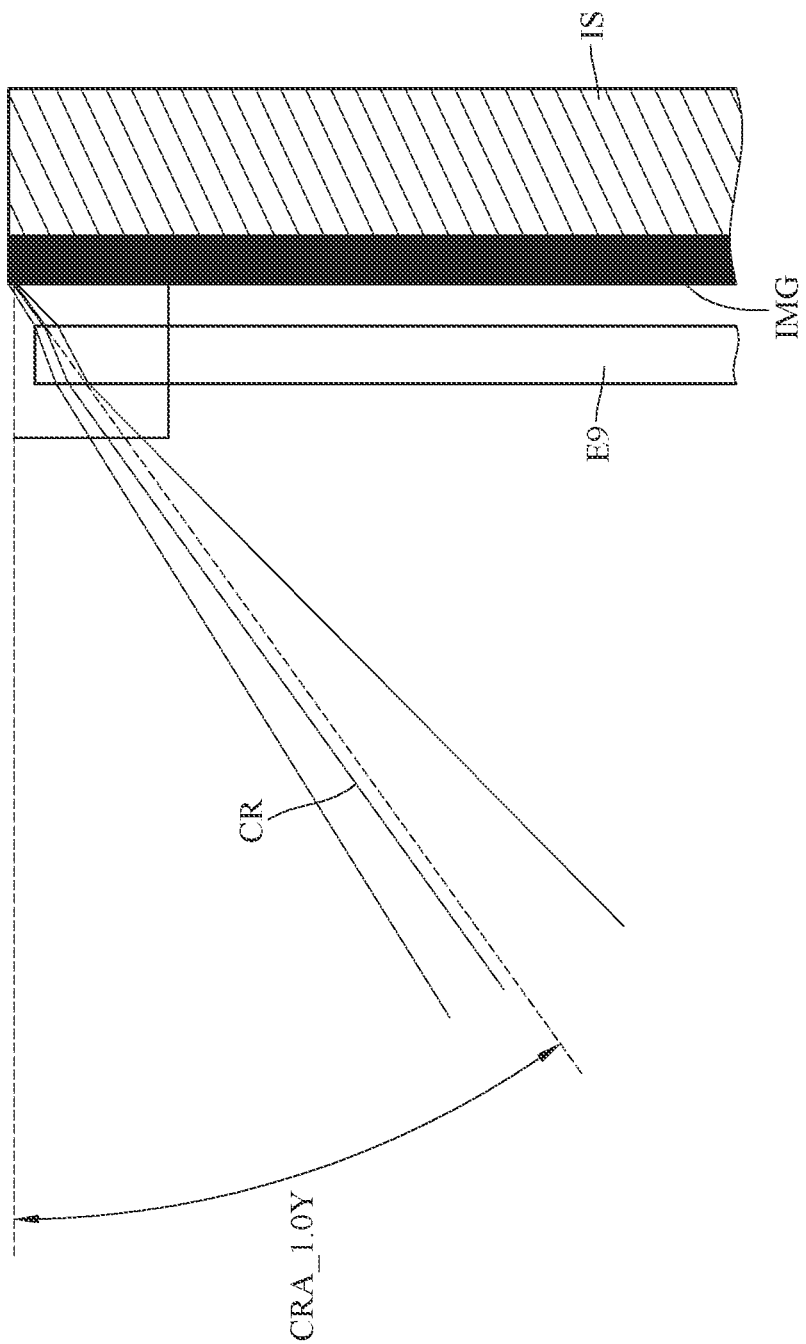
FIG. 25 shows a schematic view of CRA_1.0Y according to the 1st embodiment of the present disclosure.

When a chief ray angle at the maximum image height of the imaging optical lens system is CRA_1.0Y, the following condition can be satisfied: 40 [deg.]<CRA_1.0Y<65 [deg.]. Therefore, it is favorable for reducing the back focal length, so as to better utilize the limited space in the imaging optical lens system. Moreover, the following condition can also be satisfied: 40 [deg.]<CRA_1.0Y<60 [deg.]. Moreover, the following condition can also be satisfied: 45 [deg.] <CRA_1.0Y<60 [deg.]. Please refer to FIG. 25, which shows a schematic view of CRA_1.0Y according to the 1st embodiment of the present disclosure, wherein a chief ray CR is projected on the image surface IMG at the maximum image height position, and the angle between a normal line of the image surface IMG and the chief ray CR is CRA_1.0Y.

When the minimum value among Abbe numbers of all lens elements of the imaging optical lens system is Vmin, the following condition can be satisfied: Vmin<20. Therefore, it is favorable for correcting chromatic aberration. Moreover, the following condition can also be satisfied: Vmin<18. Moreover, the following condition can also be satisfied: Vmin<15.

When the sum of axial distances between each of all adjacent lens elements of the imaging optical lens system is ΣAT, an axial distance between the fifth lens element and the sixth lens element is T56, and the axial distance between the seventh lens element and the eighth lens element is T78, the following condition can be satisfied: ΣAT/(T56+T78)<2.0. Therefore, it is favorable for enhancing space utilization of the imaging optical lens system by preventing overly small or overly large spacing between the lens elements. Moreover, the following condition can also be satisfied: $\Sigma AT/(T56+T78)<1.75$.

According to the present disclosure, the aforementioned features and conditions can be utilized in numerous combinations so as to achieve corresponding effects.

According to the present disclosure, the lens elements of the imaging optical lens system can be made of either glass or plastic material. When the lens elements are made of glass material, the refractive power distribution of the imaging optical lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the imaging optical lens system, based on the corresponding image sensor, can be flat or curved, especially a curved surface being concave facing towards the object side of the imaging optical lens system.

According to the present disclosure, an image correction unit, such as a field flattener, can be optionally disposed between the lens element closest to the image side of the imaging optical lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 26:
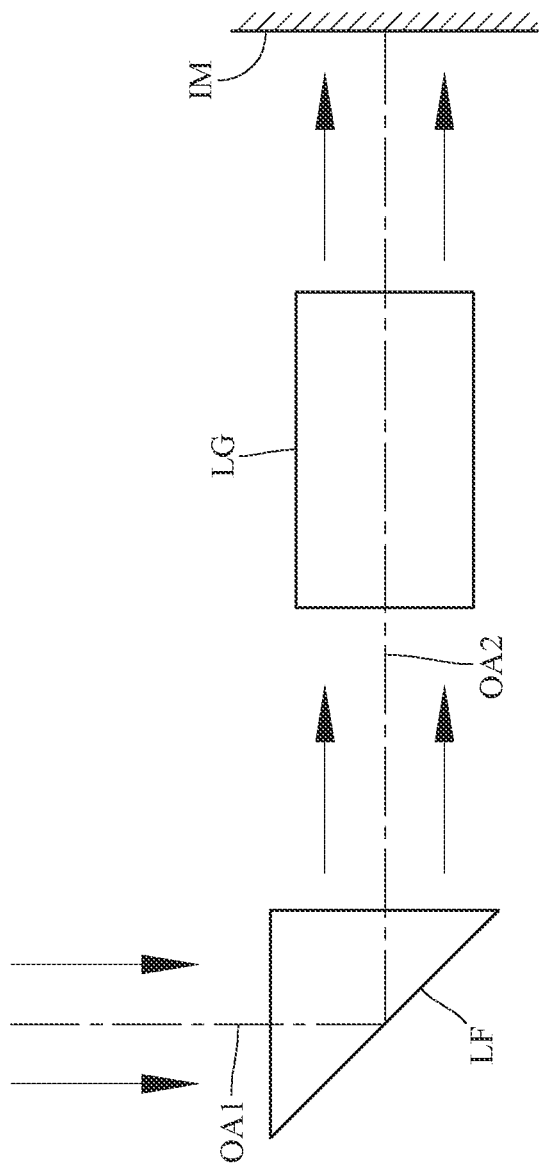
FIG. 26 shows a schematic view of a configuration of a light-folding element in an imaging optical lens system according to one embodiment of the present disclosure.
Figure 27:
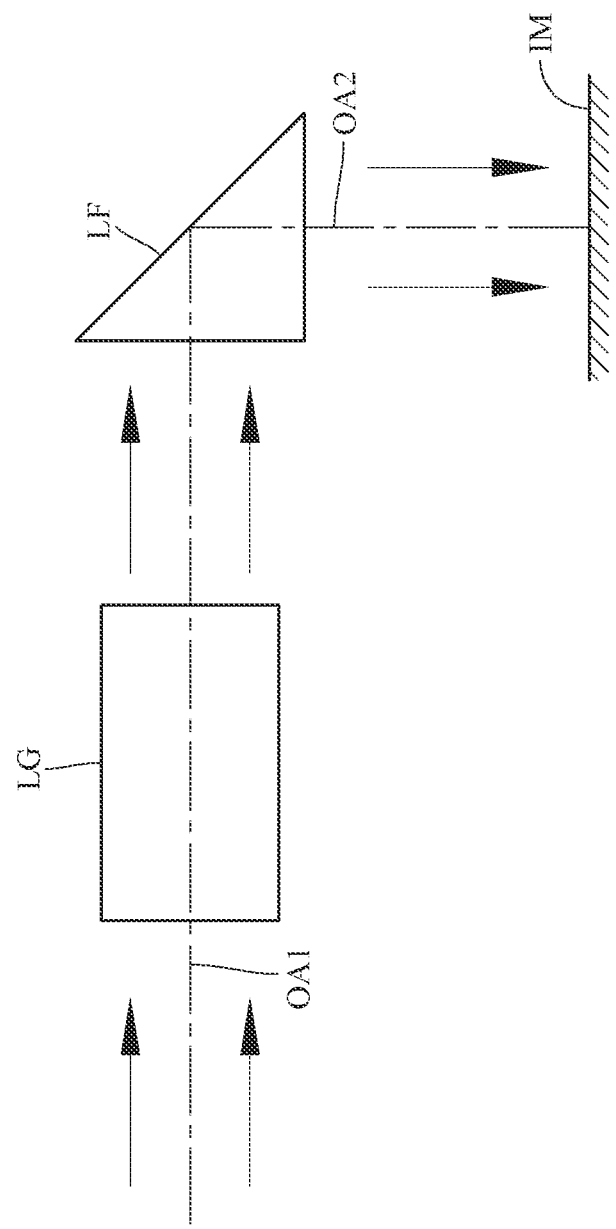
FIG. 27 shows a schematic view of another configuration of a light-folding element in an imaging optical lens system according to one embodiment of the present disclosure.
Figure 28:
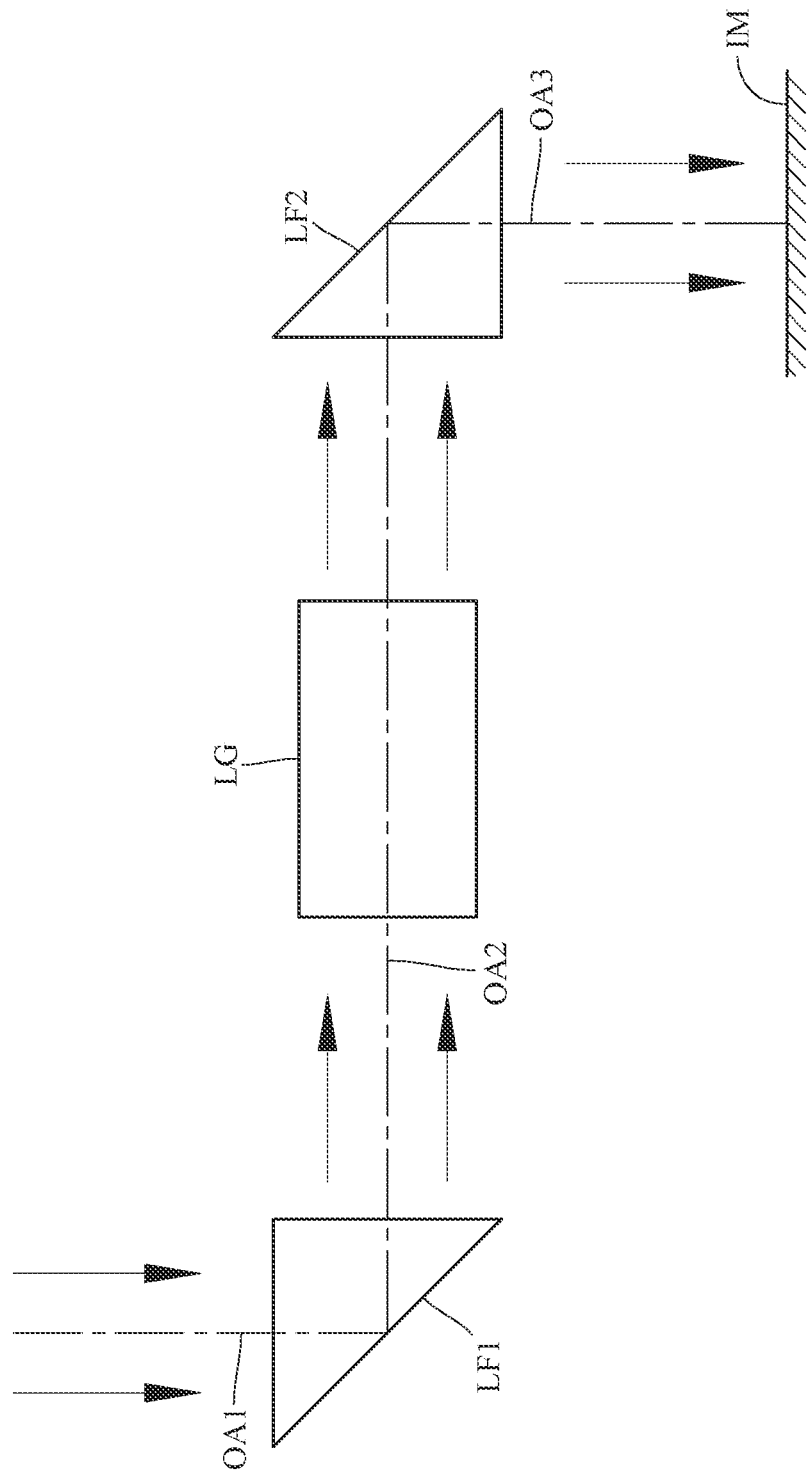
FIG. 28 shows a schematic view of a configuration of two light-folding elements in an imaging optical lens system according to one embodiment of the present disclosure.

According to the present disclosure, at least one light-folding element, such as a prism or a mirror, can be optionally disposed between an imaged object and the image surface on the imaging optical path, such that the imaging optical lens system can be more flexible in space arrangement, and therefore the dimensions of an electronic device is not restricted by the total track length of the imaging optical lens system. Specifically, please refer to FIG. 26 and FIG. 27. FIG. 26 shows a schematic view of a configuration of a light-folding element in an imaging optical lens system according to one embodiment of the present disclosure, and FIG. 27 shows a schematic view of another configuration of a light-folding element in an imaging optical lens system according to one embodiment of the present disclosure. In FIG. 26 and FIG. 27, the imaging optical lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the imaging optical lens system as shown in FIG. 26 or disposed between a lens group LG of the imaging optical lens system and the image surface IM as shown in FIG. 27. Furthermore, please refer to FIG. 28, which shows a schematic view of a configuration of two light-folding elements in an imaging optical lens system according to one embodiment of the present disclosure. In FIG. 28, the imaging optical lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens system, the second light-folding element LF2 is disposed between the lens group LG of the imaging optical lens system and the image surface IM. The imaging optical lens system can be optionally provided with three or more light-folding elements, and the present disclosure is not limited to the type, amount and position of the light-folding elements of the embodiments disclosed in the aforementioned figures.

According to the present disclosure, the imaging optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens system and thereby provides a wider field of view for the same.

According to the present disclosure, the imaging optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
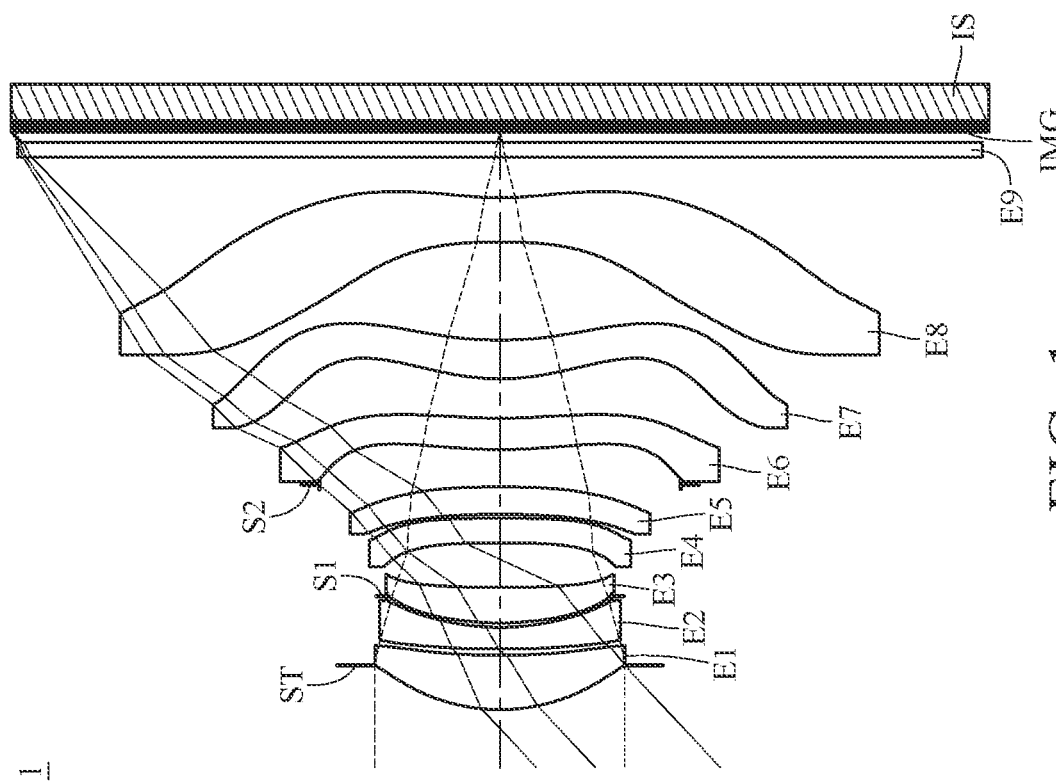
FIG. 1 is a schematic view of an image capturing unit according to the 1st embodiment of the present disclosure.
Figure 2:
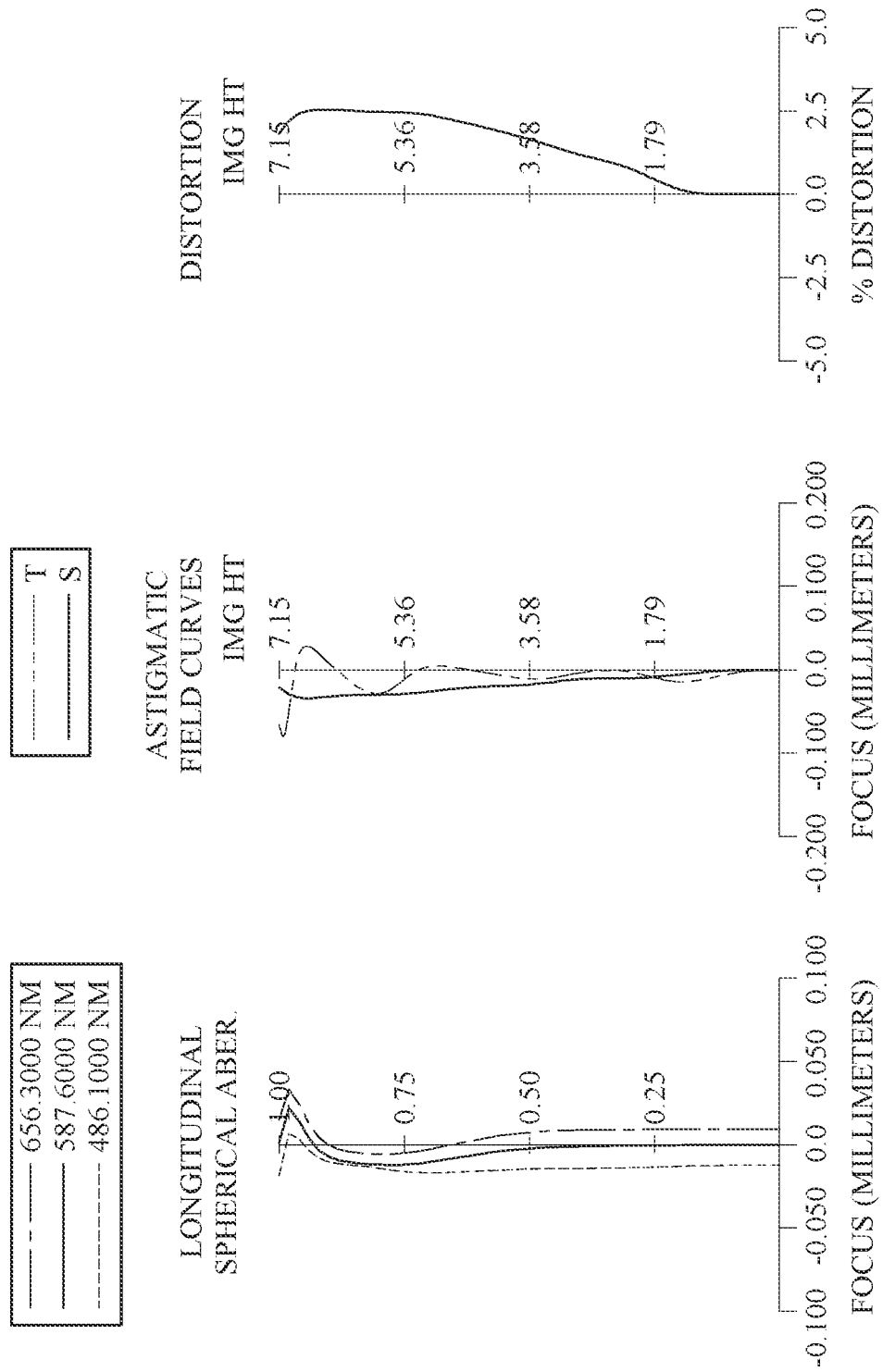
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a stop S1, a third lens element E3, a fourth lens element E4, a fifth lens element E5, a stop S2, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface the image-side surface being both aspheric.

The fifth lens element E5 with negative refractive power has an object-side surface being concave in a paraxial region thereof and an image-side surface being convex in a paraxial region thereof. The fifth lens element E5 is made of plastic material and has the object-side surface the image-side surface being both aspheric.

The sixth lens element E6 with positive refractive power has an object-side surface being convex in a paraxial region thereof and an image-side surface being concave in a paraxial region thereof. The sixth lens element E6 is made of plastic material and has the object-side surface the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface the image-side surface being both aspheric.

The IR-cut filter E9 is made of glass material and located between the eighth lens element E8 and the image surface IMG, and will not affect the focal length of the imaging optical lens system. The image sensor IS is disposed on or near the image surface IMG of the imaging optical lens system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,
X is the displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18, 20, 22, 24, 26, 28 and 30.

In the imaging optical lens system of the image capturing unit according to the 1 st embodiment, when a focal length of the imaging optical lens system is f, an f-number of the imaging optical lens system is Fno, and half of a maximum field of view of the imaging optical lens system is HFOV, these parameters have the following values: f=7.52 millimeters (mm), Fno=2.05, HFOV=43.1 degrees (deg.).

When a chief ray angle at a maximum image height of the imaging optical lens system is CRA_1.0Y, the following condition is satisfied: CRA_1.0Y=35.67 [deg.].

When an Abbe number of the third lens element E3 is V3, and an Abbe number of the fifth lens element E5 is V5, the following condition is satisfied: V3+V5=111.9.

When an Abbe number of the sixth lens element E6 is V6, the following condition is satisfied: V6=30.2.

When a minimum value among Abbe numbers of all lens elements of the imaging optical lens system is Vmin, the following condition is satisfied: Vmin=18.2. In this embodiment, an Abbe number of the fourth lens element E4 is smaller than Abbe numbers of each of the other lens elements imaging optical lens system, and Vmin is equal to the Abbe number of the fourth lens element E4.

When an Abbe number of the first lens element E1 is V1, and the Abbe number of the sixth lens element E6 is V6, the following condition is satisfied: V1/V6=1.85.

When a refractive index of the sixth lens element E6 is N6, and the Abbe number of the sixth lens element E6 is V6, the following condition is satisfied: V6/N6=19.11.

When the Abbe number of the sixth lens element E6 is V6, the minimum value among Abbe numbers of all lens elements of the imaging optical lens system is Vmin, and a maximum value among Abbe numbers of all lens elements of the imaging optical lens system is Vmax, the following condition is satisfied: V6/(Vmax−Vmin)=0.80. In this embodiment, the Abbe number of the first lens element E1, the Abbe number of the third lens element E3, the Abbe number of the fifth lens element E5, an Abbe number of the seventh lens element E7 and an Abbe number of the eighth lens element E8 are equal to one another and larger than the Abbe numbers of the other lens elements of the imaging optical lens system, and Vmax is equal to the Abbe number of the first lens element E1, the Abbe number of the third lens element E3, the Abbe number of the fifth lens element E5, the Abbe number of the seventh lens element E7 and the Abbe number of the eighth lens element E8

When an axial distance between the object-side surface of the first lens element E1 and the image-side surface of the fourth lens element E4 is Dr r8, and an axial distance between the object-side surface of the fifth lens element E5 and the image-side surface of the eighth lens element E8 is Dr9r16, the following condition is satisfied: Dr9r16/Dr1r8=1.66.

When an axial distance between the fourth lens element E4 and the fifth lens element E5 is T45, and an axial distance between the seventh lens element E7 and the eighth lens element E8 is T78, the following condition is satisfied: T78/T45=24.00. In this embodiment, an axial distance between two adjacent lens elements is a distance in a paraxial region between two adjacent lens surfaces of the two adjacent lens elements.

When the axial distance between the seventh lens element E7 and the eighth lens element E8 is T78, and an axial distance between the image-side surface of the eighth lens element E8 and the image surface IMG is BL, the following condition is satisfied: T78/BL=1.50.

When a sum of axial distances between each of all adjacent lens elements of the imaging optical lens system is ΣAT, and the axial distance between the seventh lens element E7 and the eighth lens element E8 is T78, the following condition is satisfied: ΣAT/T78=2.39.

When the sum of axial distances between each of all adjacent lens elements of the imaging optical lens system is ΣAT, an axial distance between the fifth lens element E5 and the sixth lens element E6 is T56, and the axial distance between the seventh lens element E7 and the eighth lens element E8 is T78, the following condition is satisfied: ΣAT/(T56+T78)=1.73.

When the maximum image height of the imaging optical lens system is ImgH, and the axial distance between the image-side surface of the eighth lens element E8 and the image surface IMG is BL, the following condition is satisfied: ImgH/BL=7.43.

When an axial distance between the object-side surface of the first lens element E1 and the image surface IMG is TL, and the maximum image height of the imaging optical lens system is ImgH, the following condition is satisfied: TL/ImgH=1.19.

When the focal length of the imaging optical lens system is f, a curvature radius of the object-side surface of the first lens element E1 is R1, a curvature radius of the image-side surface of the first lens element E1 is R2, a curvature radius of the object-side surface of the second lens element E2 is R3, a curvature radius of the image-side surface of the second lens element E2 is R4, a curvature radius of the object-side surface of the third lens element E3 is R5, a curvature radius of the image-side surface of the third lens element E3 is R6, a curvature radius of the object-side surface of the fourth lens element E4 is R7, a curvature radius of the image-side surface of the fourth lens element E4 is R8, a curvature radius of the object-side surface of the fifth lens element E5 is R9, a curvature radius of the image-side surface of the fifth lens element E5 is R10, a curvature radius of the object-side surface of the sixth lens element E6 is R11, a curvature radius of the image-side surface of the sixth lens element E6 is R12, a curvature radius of the object-side surface of the seventh lens element E7 is R13, a curvature radius of the image-side surface of the seventh lens element E7 is R14, a curvature radius of the object-side surface of the eighth lens element E8 is R15, a curvature radius of the image-side surface of the eighth lens element E8 is R16, a focal length of the imaging optical lens system is f, a curvature radius of an object-side surface of one lens element of the imaging optical lens system is Ro, and a curvature radius of an image-side surface of the one lens element is Ri, the following conditions are satisfied: f/|R1|+f/|R2|=3.40; f/|R3|+f/|R4|=2.65; f/|R5|+f/|R6|=1.99; f/|R7|+f/|R8|=0.43; f/|R9|+f/|R10|=0.96; f/|R11|+f/|R12|=1.87; f/|R13|+f/|R14|=3.74; and f/|R15|+f/|R16|=2.33, wherein the fourth lens element E4 satisfies the following condition: f/|Ro|+f/|Ri|<0.80.

When the curvature radius of the object-side surface of the eighth lens element E8 is R15, and the curvature radius of the image-side surface of the eighth lens element E8 is R16, the following condition is satisfied: R16/R15|=0.29.

When a focal length of the seventh lens element E7 is f7, and a focal length of the eighth lens element E8 is f8, the following condition is satisfied: |f7/f8|=2.46.

The detailed optical data of the 1st embodiment are shown in Table 1 and the aspheric surface data are shown in Table 2 below.

TABLE 1

1st Embodiment f = 7.52 mm, Fno = 2.05, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.648 | | | | |
| 2 | Lens 1 | 2.7627 | (ASP) | 0.796 | Plastic | 1.544 | 55.9 | 6.55 |
| 3 | | 11.0511 | (ASP) | 0.093 | | | | |
| 4 | Lens 2 | 13.5223 | (ASP) | 0.320 | Plastic | 1.584 | 28.2 | −8.46 |
| 5 | | 3.5893 | (ASP) | 0.453 | | | | |
| 6 | Stop | Plano | | −0.387 | | | | |
| 7 | Lens 3 | 4.6924 | (ASP) | 0.520 | Plastic | 1.544 | 55.9 | 11.26 |
| 8 | | 19.3082 | (ASP) | 0.654 | | | | |
| 9 | Lens 4 | −23.9825 | (ASP) | 0.360 | Plastic | 1.680 | 18.2 | −56.09 |
| 10 | | −64.9903 | (ASP) | 0.060 | | | | |
| 11 | Lens 5 | −14.7820 | (ASP) | 0.401 | Plastic | 1.544 | 55.9 | −251.01 |
| 12 | | −16.7360 | (ASP) | 0.034 | | | | |
| 13 | Stop | Plano | | 0.517 | | | | |
| 14 | Lens 6 | 7.7928 | (ASP) | 0.460 | Plastic | 1.583 | 30.2 | 164.86 |
| 15 | | 8.2968 | (ASP) | 0.578 | | | | |
| 16 | Lens 7 | 3.2597 | (ASP) | 0.568 | Plastic | 1.544 | 55.9 | 14.39 |
| 17 | | 5.2450 | (ASP) | 1.440 | | | | |
| 18 | Lens 8 | −14.4669 | (ASP) | 0.652 | Plastic | 1.544 | 55.9 | −5.86 |
| 19 | | 4.1492 | (ASP) | 0.600 | | | | |
| 20 | IR-cut filter | Plano | | 0.210 | Glass | 1.517 | 64.2 | — |
| 21 | | Plano | | 0.153 | | | | |
| 22 | Image | Plano | | 0.000 | | | | |

Note:
Reference wavelength is 587.6 nm (d–line).
An effective radius of the stop S1 (Surface 6) is 1.650 mm.
An effective radius of the stop S2 (Surface 13) is 2.650 mm.

TABLE 2

Aspheric Coefficients

| Surface # | 2 | 3 | 4 | 5 |
|---|---|---|---|---|
| k= | 6.312314995E−02 | 9.754562066E+00 | 0.000000000E+00 | −1.125049001E+00 |
| A4= | −1.794866645E−04 | 8.906211587E−03 | 3.344505318E−03 | −4.017943604E−03 |
| A6= | 3.105151894E−04 | −7.045309672E−03 | −5.903608193E−03 | −3.376962678E−04 |
| A8= | −6.268994313E−04 | 3.850445278E−03 | 4.252000617E−03 | 4.083187479E−03 |
| A10= | 3.090038028E−04 | −1.681912837E−03 | −1.547436217E−03 | −2.217253540E−03 |
| A12= | −1.075699521E−04 | 3.874134892E−04 | 1.511571384E−04 | 9.175444142E−04 |
| A14= | 1.844440341E−05 | −2.888374903E−05 | 1.081962119E−04 | −4.408352972E−04 |
| A16= | −3.023872639E−06 | −2.886517836E−06 | −3.234282803E−05 | 1.401464224E−04 |
| A18= | — | — | 2.210211408E−06 | −1.860914199E−05 |

| Surface # | 7 | 8 | 9 | 10 |
|---|---|---|---|---|
| k= | 0.000000000E+00 | 0.000000000E+00 | 0.000000000E+00 | 0.000000000E+00 |
| A4= | 1.070341025E−03 | 2.019586479E−03 | −2.298015739E−02 | −1.932989022E−02 |
| A6= | 3.795260824E−03 | 6.325850231E−03 | 3.966259395E−03 | 8.229152313E−04 |
| A8= | −1.155201794E−03 | −9.245648055E−03 | −1.070878034E−02 | −3.205839792E−03 |
| A10= | 3.341368901E−03 | 1.214544598E−02 | 1.024768281E−02 | 3.415988841E−03 |
| A12= | −2.319316890E−03 | −8.666385564E−03 | −6.857854331E−03 | −3.565405106E−03 |
| A14= | 7.036053507E−04 | 3.662124431E−03 | 2.934689662E−03 | 2.552281436E−03 |
| A16= | −9.270790530E−05 | −8.480721638E−04 | −7.101674641E−04 | −1.009561148E−03 |
| A18= | 4.287595046E−06 | 8.446583472E−05 | 7.098626799E−05 | 1.972959642E−04 |
| A20= | — | — | — | −1.477028658E−05 |

| Surface # | 11 | 12 | 14 | 15 |
|---|---|---|---|---|
| k= | 0.000000000E+00 | 0.000000000E+00 | −2.468090918E+01 | −9.899921267E+01 |
| A4= | −7.430854787E−03 | −1.155871334E−02 | −3.386620261E−03 | −1.589501378E−03 |
| A6= | −2.108278789E−02 | −1.106989826E−02 | −4.190747524E−03 | −7.681913693E−03 |
| A8= | 3.719945633E−02 | 1.282947198E−02 | 1.042358450E−03 | 5.207457408E−03 |
| A10= | −3.719310433E−02 | −8.043177633E−03 | 7.971755126E−04 | −2.144825568E−03 |
| A12= | 2.297486050E−02 | 3.336166305E−03 | −1.000237176E−03 | 5.597183685E−04 |
| A14= | −8.519021306E−03 | −8.757900708E−04 | 5.025881863E−04 | −9.417211237E−05 |
| A16= | 1.801892304E−03 | 1.326305789E−04 | −1.482774534E−04 | 9.965521449E−06 |
| A18= | −1.965135798E−04 | −9.962031840E−06 | 2.737608913E−05 | −6.062657704E−07 |
| A20= | 8.363615352E−06 | 2.539591983E−07 | −3.116895639E−06 | 1.562451774E−08 |
| A22= | — | — | 2.002423697E−07 | 1.871425337E−10 |
| A24= | — | — | −5.540889140E−09 | −1.365602027E−11 |

TABLE 2-continued

Aspheric Coefficients

| Surface # | 16 | 17 | 18 | 19 |
|---|---|---|---|---|
| k= | −1.541087757E+00 | −1.119552661E+01 | 0.000000000E+00 | −1.813047845E+01 |
| A4= | −2.207827339E−02 | 2.271092918E−03 | −6.309041158E−02 | −4.264232652E−02 |
| A6= | 7.646339307E−03 | 2.710764261E−03 | 3.041271497E−02 | 1.865888955E−02 |
| A8= | −6.150900643E−03 | −4.753457215E−03 | −1.160552345E−02 | −5.811706226E−03 |
| A10= | 2.831707954E−03 | 2.236739398E−03 | 2.990281237E−03 | 1.188048463E−03 |
| A12= | −8.183821670E−04 | −5.954233065E−04 | −5.081462684E−04 | −1.644584339E−04 |
| A14= | 1.590991913E−04 | 1.031542579E−04 | 5.898558653E−05 | 1.596502297E−05 |
| A16= | −2.180915649E−05 | −1.226762695E−05 | −4.831498127E−06 | −1.114084153E−06 |
| A18= | 2.152416919E−06 | 1.020907632E−06 | 2.848268903E−07 | 5.670162514E−08 |
| A20= | −1.521738682E−07 | −5.933496957E−08 | −1.216476888E−08 | −2.114849574E−09 |
| A22= | 7.494022860E−09 | 2.356606899E−09 | 3.737153980E−10 | 5.744497799E−11 |
| A24= | −2.431682123E−10 | −6.086453425E−11 | −8.060122002E−12 | −1.111763043E−12 |
| A26= | 4.659226560E−12 | 9.198605976E−13 | 1.159413194E−13 | 1.460319961E−14 |
| A28= | −3.986436963E−14 | −6.166029971E−15 | −9.995184034E−16 | −1.171900679E−16 |
| A30= | — | — | 3.908222480E−18 | 4.348988680E−19 |

In Table 1, the curvature radius, the thickness and the focal length are shown in millimeters (mm). Surface numbers 0-22 represent the surfaces sequentially arranged from the object side to the image side along the optical axis. In Table 2, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
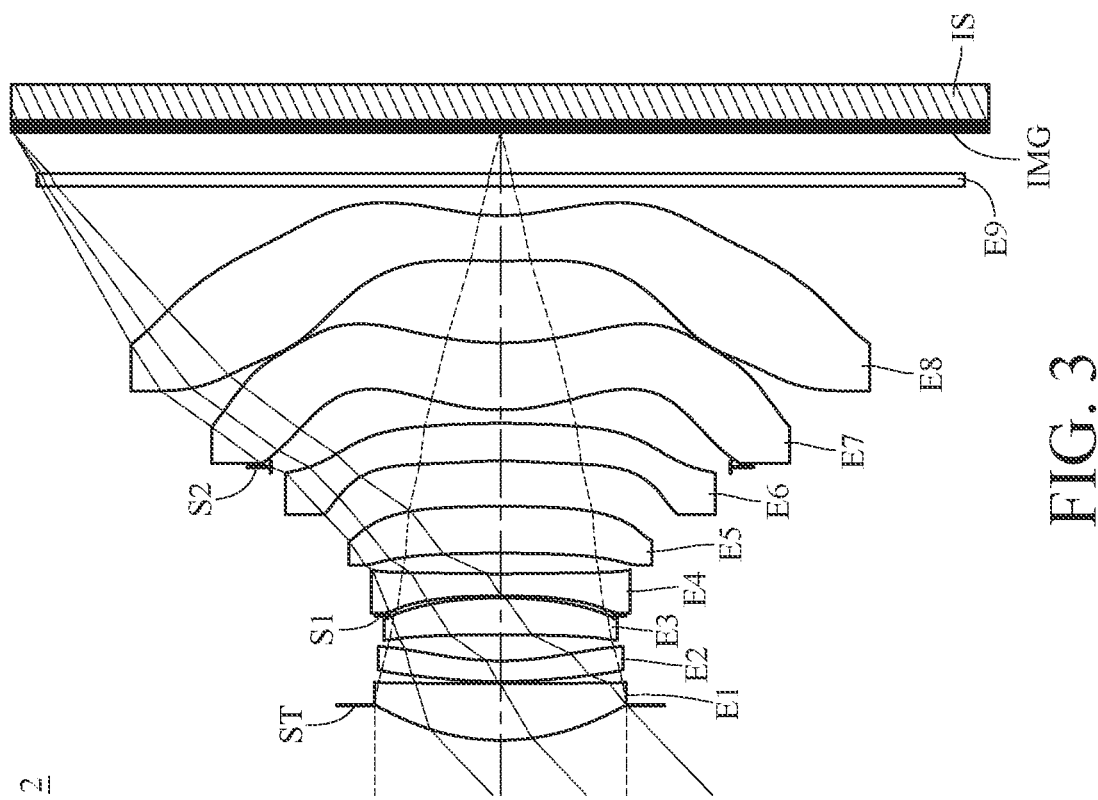
FIG. 3 is a schematic view of an image capturing unit according to the 2nd embodiment of the present disclosure.
Figure 4:
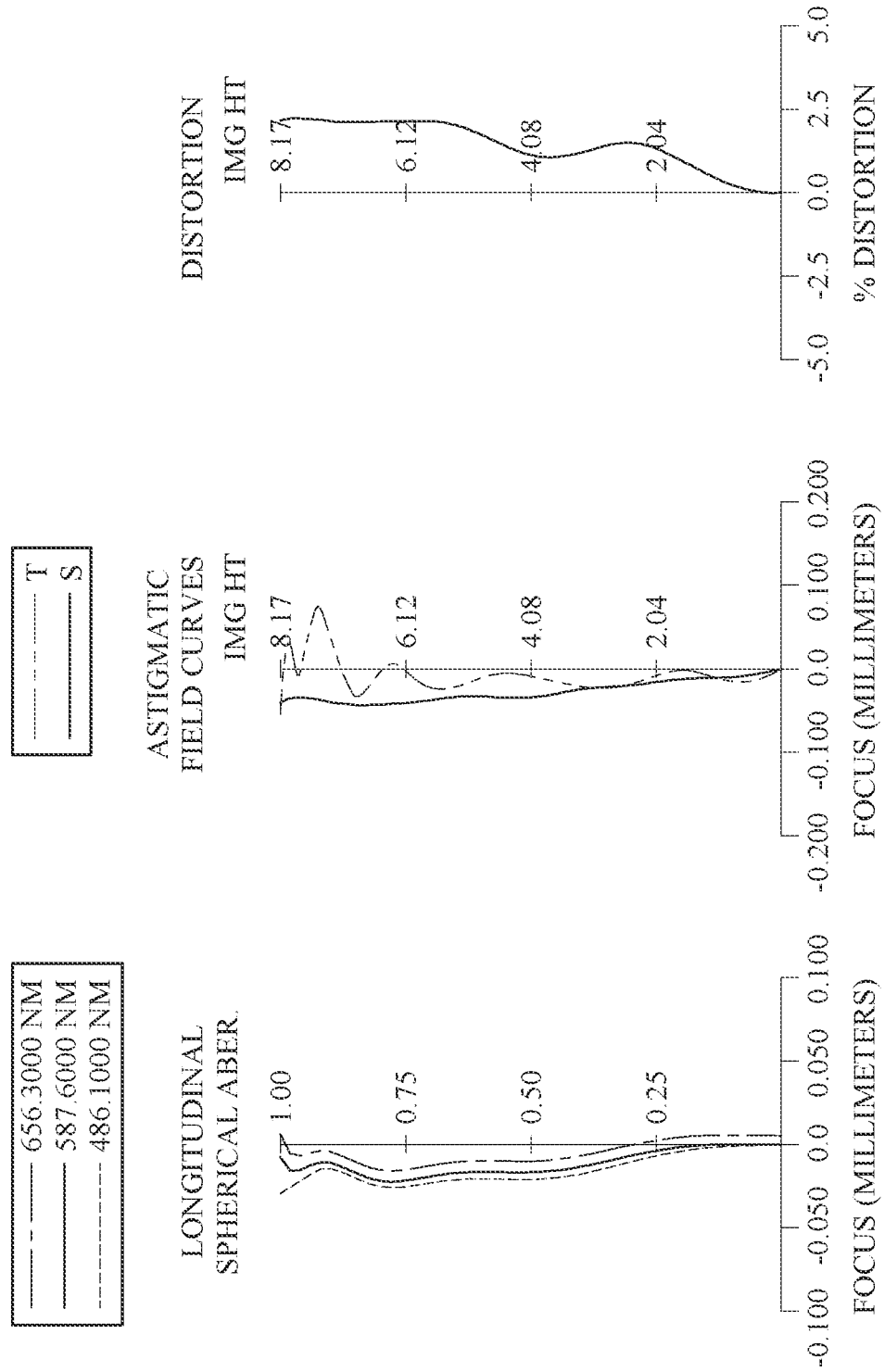
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a third lens element E3, a stop S1, a fourth lens element E4, a fifth lens element E5, a sixth lens element E6, a stop S2, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 2nd embodiment are shown in Table 3 and the aspheric surface data are shown in Table 4 below.

TABLE 3

2nd Embodiment f = 8.36 mm, Fno = 1.98, HFOV = 43.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.587 | | | | |
| 2 | Lens 1 | 3.8393 | (ASP) | 0.950 | Plastic | 1.544 | 56.0 | 6.94 |
| 3 | | −200.0000 | (ASP) | 0.035 | | | | |
| 4 | Lens 2 | 8.9013 | (ASP) | 0.347 | Plastic | 1.584 | 28.2 | −18.30 |
| 5 | | 4.7873 | (ASP) | 0.437 | | | | |
| 6 | Lens 3 | −55.2682 | (ASP) | 0.620 | Plastic | 1.544 | 56.0 | 13.97 |
| 7 | | −6.7095 | (ASP) | −0.293 | | | | |
| 8 | Stop | Plano | | 0.328 | | | | |
| 9 | Lens 4 | −12.3014 | (ASP) | 0.368 | Plastic | 1.634 | 23.8 | −13.99 |
| 10 | | 32.1774 | (ASP) | 0.346 | | | | |
| 11 | Lens 5 | −30.9232 | (ASP) | 0.786 | Plastic | 1.566 | 37.4 | 68.34 |
| 12 | | −17.3437 | (ASP) | 0.761 | | | | |
| 13 | Lens 6 | −7.5030 | (ASP) | 0.633 | Plastic | 1.566 | 37.4 | −38.45 |
| 14 | | −11.8000 | (ASP) | −0.735 | | | | |
| 15 | Stop | Plano | | 0.956 | | | | |
| 16 | Lens 7 | 3.3475 | (ASP) | 1.127 | Plastic | 1.544 | 56.0 | 14.66 |
| 17 | | 5.0845 | (ASP) | 1.372 | | | | |
| 18 | Lens 8 | 10.9018 | (ASP) | 0.760 | Plastic | 1.544 | 56.0 | −8.84 |
| 19 | | 3.2561 | (ASP) | 0.500 | | | | |
| 20 | IR-cut filter | Plano | | 0.210 | Glass | 1.517 | 64.2 | — |
| 21 | | Plano | | 0.684 | | | | |
| 22 | Image | Plano | | 0.000 | | | | |

Note:
Reference wavelength is 587.6 nm (d-line).
An effective radius of the stop S1 (Surface 8) is 1.900 mm.
An effective radius of the stop S2 (Surface 15) is 3.850 mm.

TABLE 4

Aspheric Coefficients

| Surface # | 2 | 3 | 4 | 5 |
|---|---|---|---|---|
| k= | 0.000000000E+00 | 0.000000000E+00 | 0.000000000E+00 | 0.000000000E+00 |
| A4= | −4.117190616E−04 | 6.716283958E−03 | −4.027283483E−03 | −1.297776677E−02 |
| A6= | 8.738768202E−05 | −4.536658103E−03 | −1.176432625E−02 | 9.844115252E−04 |
| A8= | −2.332952934E−04 | 3.138133345E−03 | 2.447386125E−04 | −1.856293512E−03 |
| A10= | 1.428164255E−04 | −1.629684329E−03 | 9.651212719E−04 | 2.295394540E−03 |
| A12= | −6.420864733E−05 | 5.464378909E−04 | −9.593373756E−04 | −1.720203289E−03 |
| A14= | 1.799823637E−05 | −1.115187724E−04 | 4.328457478E−04 | 7.420364721E−04 |
| A16= | −3.134983430E−06 | 1.174897279E−05 | −1.063698949E−04 | −1.828941559E−04 |
| A18= | 2.605461985E−07 | −2.933612107E−07 | 1.387366619E−05 | 2.422726857E−05 |
| A20= | −4.631183110E−09 | −2.488539195E−08 | −7.452185433E−07 | −1.336736385E−06 |

| Surface # | 6 | 7 | 9 | 10 |
|---|---|---|---|---|
| k= | 0.000000000E+00 | 0.000000000E+00 | 0.000000000E+00 | 0.000000000E+00 |
| A4= | −1.067419461E−04 | 1.127772675E−02 | 2.110182997E−03 | −2.348137942E−03 |
| A6= | −3.898546568E−03 | −2.488356056E−02 | −2.381355442E−02 | −6.723138025E−03 |
| A8= | 2.793310739E−03 | 2.456244844E−02 | 2.675561837E−02 | 8.462706432E−03 |
| A10= | −2.098096516E−03 | −1.647819956E−02 | −1.914318070E−02 | −5.335877473E−03 |
| A12= | 1.027558898E−03 | 7.180093324E−03 | 8.883706060E−03 | 2.133997363E−03 |
| A14= | −2.920928079E−04 | −1.931366149E−03 | −2.659011529E−03 | −5.547170697E−04 |
| A16= | 4.589146904E−05 | 2.893476402E−04 | 4.809903587E−04 | 8.944535742E−05 |
| A18= | −3.084359395E−06 | −1.833817100E−05 | −4.566639869E−05 | −7.885336706E−06 |
| A20= | — | — | 1.607952064E−06 | 2.817860972E−07 |

| Surface # | 11 | 12 | 13 | 14 |
|---|---|---|---|---|
| k= | 0.000000000E+00 | 0.000000000E+00 | 3.210518619E+00 | 0.000000000E+00 |
| A4= | 4.811968317E−03 | 1.128701244E−02 | 4.600637809E−02 | 1.345391160E−02 |
| A6= | −1.420009909E−02 | −2.088056467E−02 | −2.560929764E−02 | −3.716263519E−03 |
| A8= | 1.336330401E−02 | 2.463124692E−02 | 1.461334915E−02 | −9.474050600E−04 |
| A10= | −9.602785918E−03 | −2.563272247E−02 | −8.819561569E−03 | 4.604062312E−04 |
| A12= | 5.122571639E−03 | 1.891503816E−02 | 4.357090167E−03 | −9.294765818E−06 |
| A14= | −1.896606611E−03 | −9.562704520E−03 | −1.605969427E−03 | −2.895100011E−05 |

TABLE 4-continued

| Aspheric Coefficients | | | | |
|---|---|---|---|---|
| A16= | 4.563912058E−04 | 3.317169167E−03 | 4.335107125E−04 | 7.388334157E−06 |
| A18= | −6.444768445E−05 | −7.877307108E−04 | −8.544277126E−05 | −8.201777145E−07 |
| A20= | 3.890161405E−06 | 1.257296556E−04 | 1.214554209E−05 | 3.757684853E−08 |
| A22= | 1.196799657E−07 | −1.288125474E−05 | −1.207310292E−06 | 8.046496524E−10 |
| A24= | −2.009722041E−08 | 7.643843273E−07 | 7.912948877E−08 | −1.757629082E−10 |
| A26= | — | −1.994326019E−08 | −3.051732282E−09 | 7.709285273E−12 |
| A28= | — | — | 5.214430304E−11 | −1.189738791E−13 |

| Surface # | 16 | 17 | 18 | 19 |
|---|---|---|---|---|
| k= | −1.000000000E+00 | 0.000000000E+00 | 0.000000000E+00 | −1.000000000E+00 |
| A4= | −2.398980920E−02 | −1.457529579E−02 | −4.263304204E−02 | −4.306945366E−02 |
| A6= | 9.437246178E−03 | 8.653155073E−03 | 4.556236545E−03 | 7.358284952E−03 |
| A8= | −4.302355284E−03 | −3.782674199E−03 | 1.103431555E−03 | −9.022059935E−04 |
| A10= | 1.058702438E−03 | 8.435491874E−04 | −6.159558831E−04 | 6.025023811E−05 |
| A12= | −1.620692359E−04 | −1.138464375E−04 | 1.221003113E−04 | −2.558056515E−06 |
| A14= | 1.726381104E−05 | 9.749672098E−06 | −1.363786456E−05 | 2.910097546E−07 |
| A16= | −1.464895131E−06 | −5.393956477E−07 | 9.693215587E−07 | −4.264594527E−08 |
| A18= | 1.077792486E−07 | 2.066302976E−08 | −4.614924289E−08 | 3.586191361E−09 |
| A20= | −6.366783247E−09 | −7.179836745E−10 | 1.497286232E−09 | −1.822646315E−10 |
| A22= | 2.570093558E−10 | 2.916224631E−11 | −3.279334187E−11 | 5.947059844E−12 |
| A24= | −5.978204998E−12 | −1.008459182E−12 | 4.651169237E−13 | −1.264731874E−13 |
| A26= | 5.945074445E−14 | 2.029135718E−14 | −3.864591120E−15 | 1.704668044E−15 |
| A28= | — | −1.692841507E−16 | 1.430455980E−17 | −1.327888850E−17 |
| A30= | — | — | — | 4.568774576E−20 |

In the 2nd embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.36 | ΣAT/(T56 + T78) | 1.50 |
| Fno | 1.98 | ImgH/BL | 5.86 |
| HFOV [deg.] | 43.7 | TL/ImgH | 1.25 |
| CRA_1.0Y [deg.] | 34.74 | f/|R1| + f/|R2| | 2.22 |
| V3 + V5 | 93.4 | f/|R3| + f/|R4| | 2.69 |
| V6 | 37.4 | f/|R5| + f/|R6| | 1.40 |
| Vmin | 23.8 | f/|R7| + f/|R8| | 0.94 |
| V1/V6 | 1.50 | f/|R9| + f/|R10| | 0.75 |
| V6/N6 | 23.91 | f/|R11| + f/|R12| | 1.82 |
| V6/(Vmax − Vmin) | 1.16 | f/|R13| + f/|R14| | 4.14 |
| Dr9r16/Dr1r8 | 2.03 | f/|R15| + f/|R16| | 3.34 |
| T78/T45 | 3.97 | |R16/R15| | 0.30 |
| T78/BL | 0.98 | |f7/f8| | 1.66 |
| ΣAT/T78 | 2.34 | — | — |

3rd Embodiment

Figure 5:
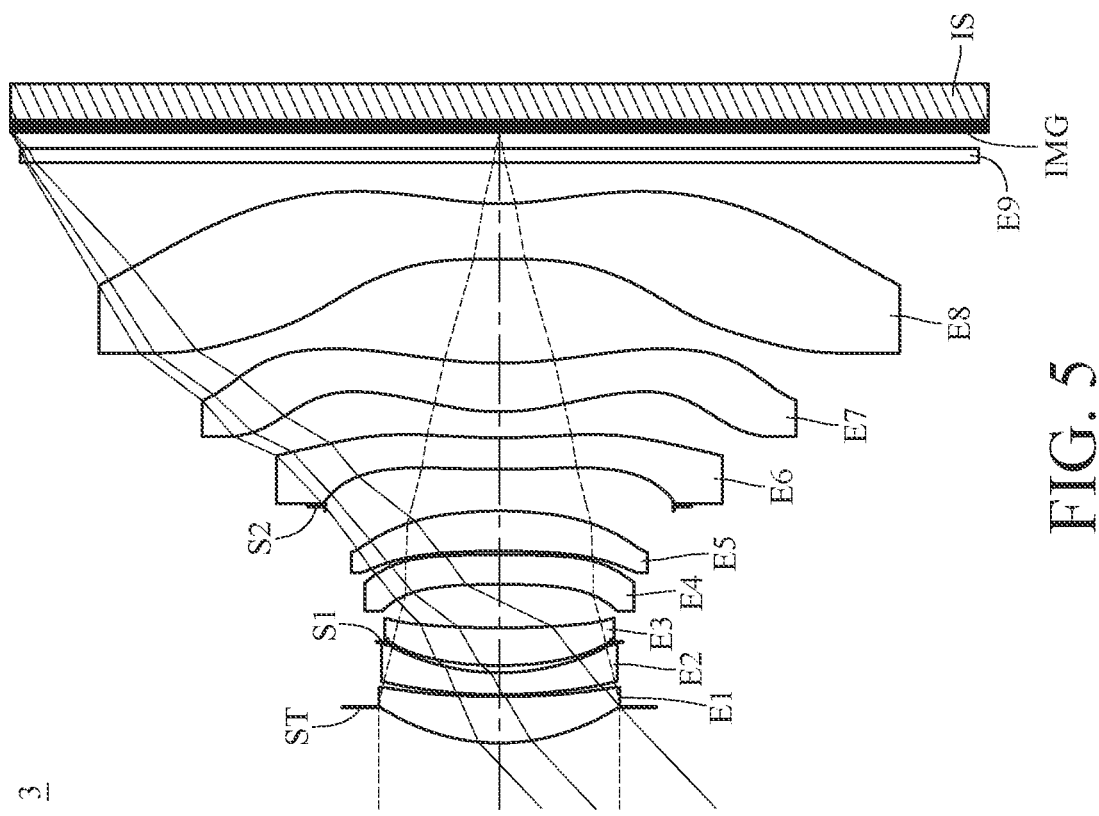
FIG. 5 is a schematic view of an image capturing unit according to the 3rd embodiment of the present disclosure.
Figure 6:
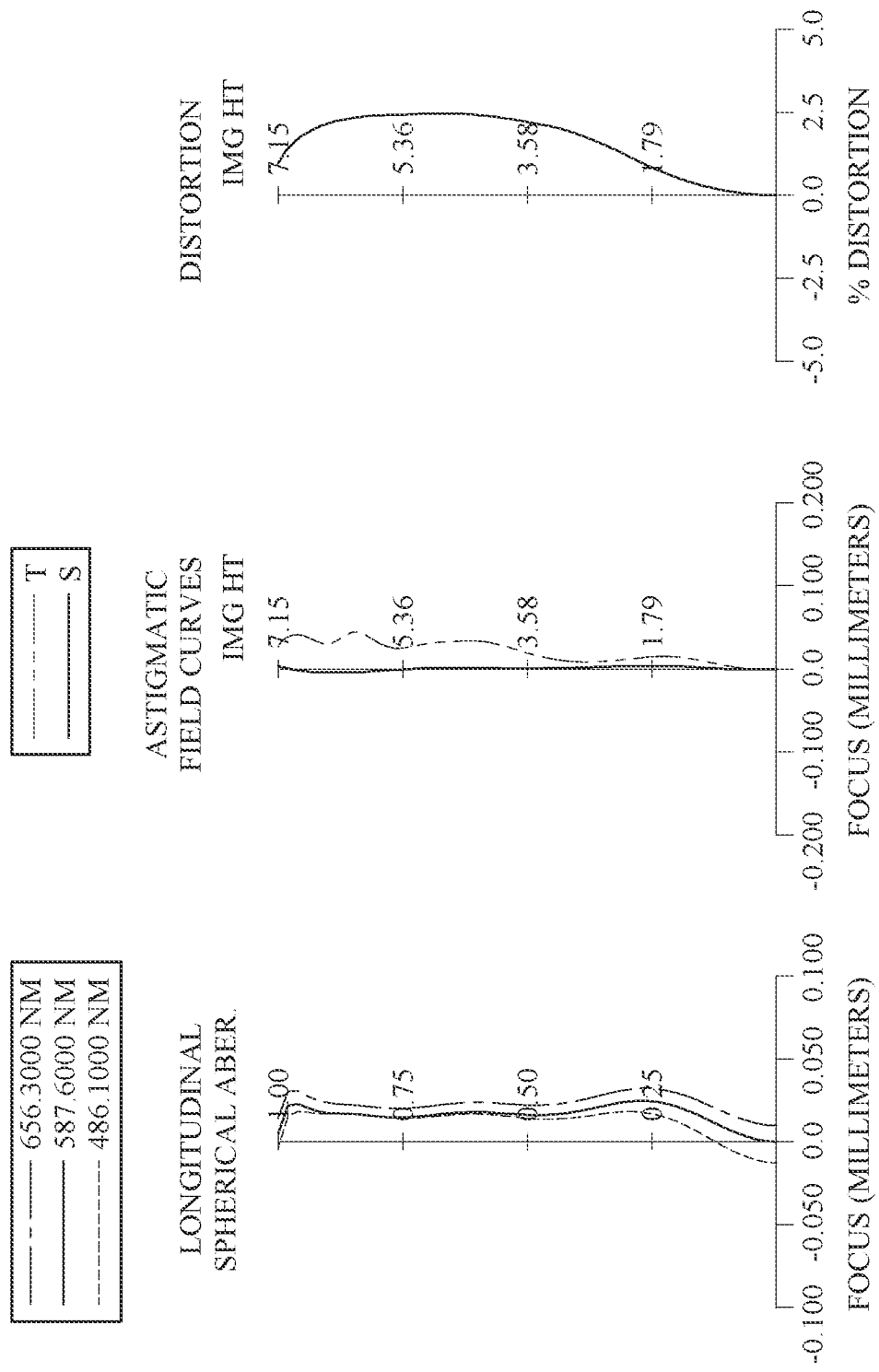
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a stop S1, a third lens element E3, a fourth lens element E4, a fifth lens element E5, a stop S2, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 3rd embodiment are shown in Table 5 and the aspheric surface data are shown in Table 6 below.

TABLE 5

3rd Embodiment f = 7.49 mm, Fno = 2.12, HFOV = 43.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.528 | | | | |
| 2 | Lens 1 | 3.1256 | (ASP) | 0.680 | Plastic | 1.544 | 56.0 | 7.19 |
| 3 | | 14.3809 | (ASP) | 0.030 | | | | |
| 4 | Lens 2 | 7.4934 | (ASP) | 0.320 | Plastic | 1.607 | 26.6 | −10.06 |
| 5 | | 3.3110 | (ASP) | 0.454 | | | | |
| 6 | Stop | Plano | | −0.348 | | | | |
| 7 | Lens 3 | 5.1094 | (ASP) | 0.554 | Plastic | 1.544 | 56.0 | 14.11 |
| 8 | | 14.6970 | (ASP) | 0.637 | | | | |
| 9 | Lens 4 | −15.8857 | (ASP) | 0.435 | Plastic | 1.614 | 26.0 | 251.28 |
| 10 | | −14.5522 | (ASP) | 0.059 | | | | |
| 11 | Lens 5 | −6.7961 | (ASP) | 0.585 | Plastic | 1.544 | 56.0 | 47.18 |
| 12 | | −5.5364 | (ASP) | 0.066 | | | | |
| 13 | Stop | Plano | | 0.545 | | | | |
| 14 | Lens 6 | 24.6392 | (ASP) | 0.460 | Plastic | 1.582 | 30.2 | −19.55 |
| 15 | | 7.7347 | (ASP) | 0.381 | | | | |
| 16 | Lens 7 | 3.0339 | (ASP) | 0.716 | Plastic | 1.544 | 56.0 | 10.29 |
| 17 | | 6.0743 | (ASP) | 1.531 | | | | |
| 18 | Lens 8 | −26.4365 | (ASP) | 0.809 | Plastic | 1.544 | 56.0 | −6.30 |
| 19 | | 3.9767 | (ASP) | 0.600 | | | | |
| 20 | IR-cut filter | Plano | | 0.210 | Glass | 1.517 | 64.2 | — |
| 21 | | Plano | | 0.240 | | | | |
| 22 | Image | Plano | | 0.000 | | | | |

Note:
Reference wavelength is 587.6 nm (d-line).
An effective radius of the stop S1 (Surface 6) is 1.640 mm.
An effective radius of the image-side surface of the third lens element E3 (Surface 8) is 1.680 mm.
An effective radius of the stop S2 (Surface 13) is 2.555 mm.

TABLE 6

Aspheric Coefficients

| Surface # | 2 | 3 | 4 | 5 |
|---|---|---|---|---|
| k= | 1.158007541E−01 | 2.528333568E+01 | 0.000000000E+00 | −1.029025511E+00 |
| A4= | −7.585288795E−04 | 1.053286184E−02 | −2.422614844E−03 | −7.880677589E−03 |
| A6= | 1.568869279E−03 | −3.876345900E−03 | 4.758307523E−03 | 8.947924319E−03 |
| A8= | −2.145782256E−03 | −2.099373732E−03 | −1.163386956E−02 | −8.471034565E−03 |
| A10= | 1.492304375E−03 | 3.408649101E−03 | 1.212996147E−02 | 6.079054344E−03 |
| A12= | −6.193873818E−04 | −1.767951724E−03 | −6.634851350E−03 | −1.874870431E−03 |
| A14= | 1.352276617E−04 | 4.273806308E−04 | 2.036423877E−03 | 1.964867512E−05 |
| A16= | −1.296533055E−05 | −4.162888893E−05 | −3.287638725E−04 | 1.083282660E−04 |
| A18= | — | — | 2.153871696E−05 | −1.682224675E−05 |

| Surface # | 7 | 8 | 9 | 10 |
|---|---|---|---|---|
| k= | 0.000000000E+00 | 0.000000000E+00 | 0.000000000E+00 | 0.000000000E+00 |
| A4= | 3.646104804E−03 | 1.591715134E−02 | −1.661493563E−02 | 6.756243406E−02 |
| A6= | 7.457335869E−03 | −2.036315713E−03 | −1.690811912E−02 | −1.367821038E−01 |
| A8= | −8.885790059E−03 | 4.552674283E−03 | 1.823498608E−02 | 1.266212719E−01 |
| A10= | 7.519164126E−03 | −4.164100301E−03 | −1.457066966E−02 | −7.882337466E−02 |
| A12= | −3.110586724E−03 | 2.397648405E−03 | 7.190819997E−03 | 3.408825647E−02 |
| A14= | 6.574172576E−04 | −7.511483127E−04 | −2.185235416E−03 | −1.020714083E−02 |

TABLE 6-continued

| Aspheric Coefficients | | | | |
|---|---|---|---|---|
| A16= | −6.590331843E−05 | 1.168204592E−04 | 3.801451428E−04 | 2.003515581E−03 |
| A18= | 2.813039972E−06 | −6.201590139E−06 | −3.045610702E−05 | −2.287050660E−04 |
| A20= | — | — | — | 1.138716045E−05 |

| Surface # | 11 | 12 | 14 | 15 |
|---|---|---|---|---|
| k= | 0.000000000E+00 | 0.000000000E+00 | −3.718200337E+00 | −7.085023787E+01 |
| A4= | 1.015939617E−01 | 1.669311006E−02 | 7.429283896E−03 | −1.779365920E−02 |
| A6= | −1.587104507E−01 | −3.130008763E−02 | −1.554849932E−02 | 1.058748760E−02 |
| A8= | 1.341560858E−01 | 1.799623034E−02 | 9.454443893E−03 | −7.822184565E−03 |
| A10= | −7.355295721E−02 | −5.257868883E−03 | −5.606517215E−03 | 3.671167304E−03 |
| A12= | 2.745432497E−02 | 2.326971200E−04 | 2.822709161E−03 | −1.109898544E−03 |
| A14= | −7.032570914E−03 | 3.903202849E−04 | −1.039690445E−03 | 2.232350038E−04 |
| A16= | 1.172731706E−03 | −1.410872548E−04 | 2.624353336E−04 | −3.008254244E−05 |
| A18= | −1.118289471E−04 | 2.095158041E−05 | −4.392536628E−05 | 2.679731951E−06 |
| A20= | 4.503556156E−06 | −1.168426102E−06 | 4.654913945E−06 | −1.513113839E−07 |
| A22= | — | — | −2.828495949E−07 | 4.904825827E−09 |
| A24= | — | — | 7.509344475E−09 | −6.952126159E−11 |

| Surface # | 16 | 17 | 18 | 19 |
|---|---|---|---|---|
| k= | −1.402141979E+00 | −9.937329107E+00 | 0.000000000E+00 | −1.167154337E+01 |
| A4= | −4.911688512E−02 | −1.089782709E−02 | −4.138640461E−02 | −2.297666344E−02 |
| A6= | 2.414840795E−02 | 6.814543532E−03 | 1.058769002E−02 | 6.188193812E−03 |
| A8= | −1.212555014E−02 | −3.563395066E−03 | −1.755012436E−03 | −1.256496879E−03 |
| A10= | 4.429927071E−03 | 1.082421817E−03 | 5.651752230E−05 | 1.812361259E−04 |
| A12= | −1.167917338E−03 | −2.123322859E−04 | 4.474109803E−05 | −1.951938483E−05 |
| A14= | 2.246426044E−04 | 2.873459450E−05 | −1.051977182E−05 | 1.647999022E−06 |
| A16= | −3.165544448E−05 | −2.782436367E−06 | 1.231449397E−06 | −1.112244767E−07 |
| A18= | 3.238954287E−06 | 1.961792800E−07 | −9.108468210E−08 | 5.931910895E−09 |
| A20= | −2.359532244E−07 | −1.010114269E−08 | 4.561989977E−09 | −2.426560682E−10 |
| A22= | 1.185061701E−08 | 3.740961075E−10 | −1.578142591E−10 | 7.338100377E−12 |
| A24= | −3.885319838E−10 | −9.514416973E−12 | 3.732392929E−12 | −1.570262853E−13 |
| A26= | 7.469262603E−12 | 1.491166826E−13 | −5.780802658E−14 | 2.234070056E−15 |
| A28= | −6.379826584E−14 | −1.082475447E−15 | 5.296616622E−16 | −1.888432915E−17 |
| A30= | — | — | −2.179621883E−18 | 7.160279956E−20 |

In the 3rd embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 7.49 | ΣAT/(T56 + T78) | 1.57 |
| Fno | 2.12 | ImgH/BL | 6.81 |
| HFOV [deg.] | 43.3 | TL/ImgH | 1.25 |
| CRA_1.0Y [deg.] | 34.34 | f/|R1| + f/|R2| | 2.92 |
| V3 + V5 | 112.0 | f/|R3| + f/|R4| | 3.26 |
| V6 | 30.2 | f/|R5| + f/|R6| | 1.98 |
| Vmin | 26.0 | f/|R7| + f/|R8| | 0.99 |
| V1/V6 | 1.85 | f/|R9| + f/|R10| | 2.46 |
| V6/N6 | 19.11 | f/|R11| + f/|R12| | 1.27 |
| V6/(Vmax − Vmin) | 1.01 | f/|R13| + f/|R14| | 3.70 |
| Dr9r16/Dr1r8 | 1.84 | f/|R15| + f/|R16| | 2.17 |
| T78/T45 | 25.95 | |R16/R15| | 0.15 |
| T78/BL | 1.46 | |f7/f8| | 1.63 |
| ΣAT/T78 | 2.19 | — | — |

4th Embodiment

Figure 7:
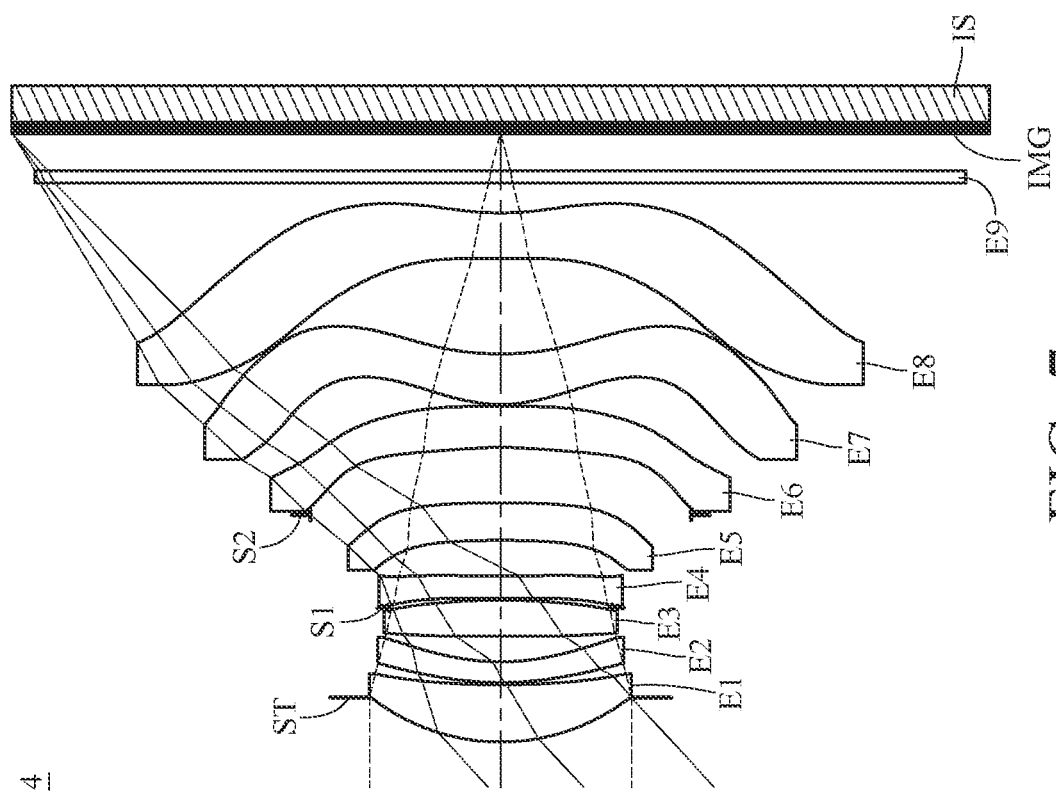
FIG. 7 is a schematic view of an image capturing unit according to the 4th embodiment of the present disclosure.
Figure 8:
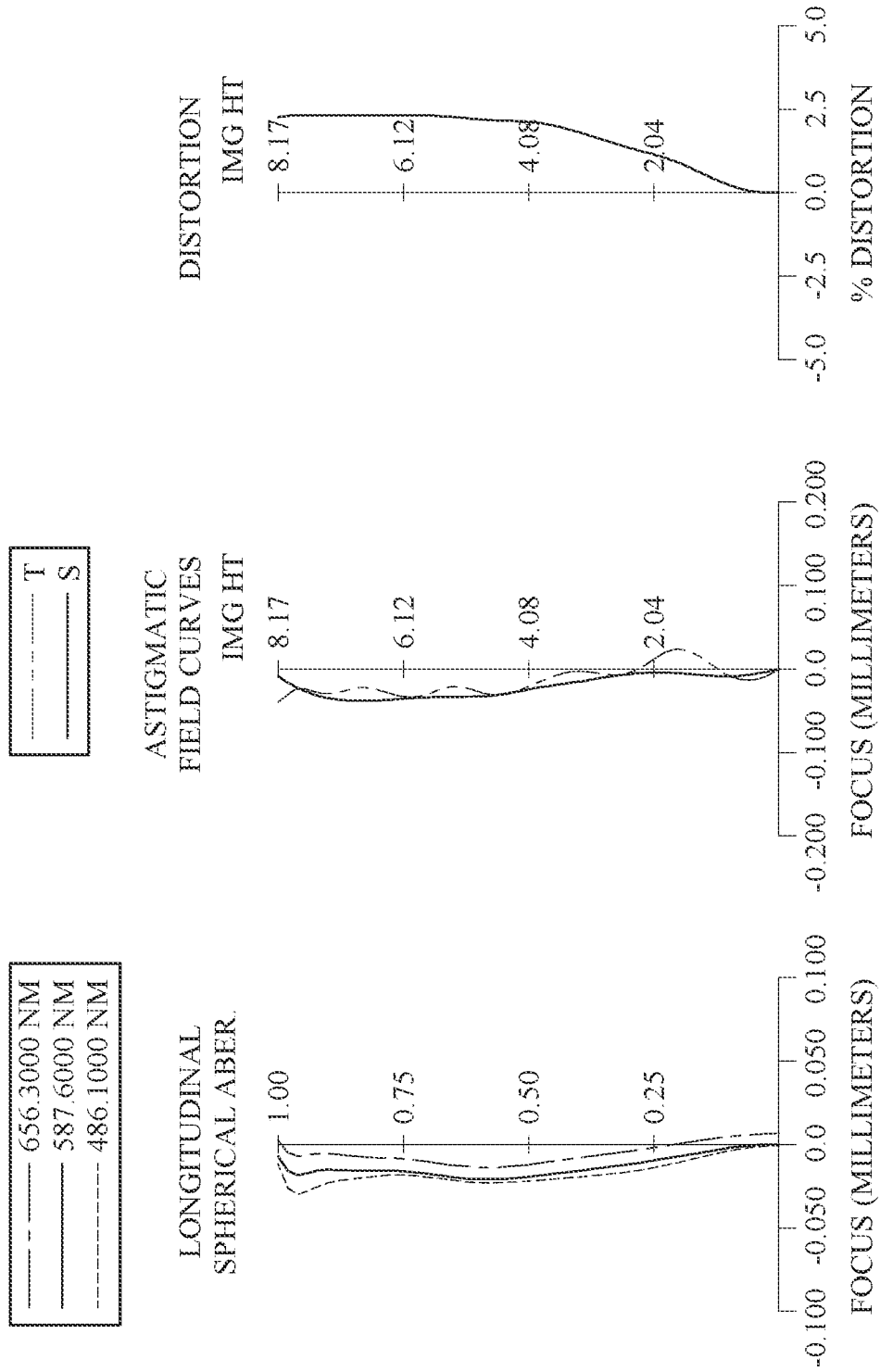
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a third lens element E3, a stop S1, a fourth lens element E4, a fifth lens element E5, a stop S2, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface MG, and will not affect the focal length of the imaging optical lens system. The image sensor IS is disposed on or near the image surface MG of the imaging optical lens system.

The detailed optical data of the 4th embodiment are shown in Table 7 and the aspheric surface data are shown in Table 8 below.

TABLE 7

4th Embodiment f = 8.68 mm, Fno = 1.98, HFOV = 42.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.744 | | | | |
| 2 | Lens 1 | 3.5098 | (ASP) | 0.961 | Plastic | 1.545 | 56.1 | 7.99 |
| 3 | | 16.3543 | (ASP) | 0.035 | | | | |
| 4 | Lens 2 | 5.4291 | (ASP) | 0.347 | Plastic | 1.669 | 19.5 | −21.10 |
| 5 | | 3.8204 | (ASP) | 0.425 | | | | |
| 6 | Lens 3 | 95.8055 | (ASP) | 0.606 | Plastic | 1.544 | 56.0 | 19.55 |
| 7 | | −11.9391 | (ASP) | −0.123 | | | | |
| 8 | Stop | Plano | | 0.160 | | | | |
| 9 | Lens 4 | −198.9761 | (ASP) | 0.368 | Plastic | 1.669 | 19.5 | −40.50 |
| 10 | | 31.3939 | (ASP) | 0.597 | | | | |
| 11 | Lens 5 | −18.8120 | (ASP) | 0.626 | Plastic | 1.544 | 56.0 | −227.30 |
| 12 | | −22.4475 | (ASP) | −0.206 | | | | |
| 13 | Stop | Plano | | 1.134 | | | | |
| 14 | Lens 6 | −6.8942 | (ASP) | 0.686 | Plastic | 1.566 | 37.4 | −11.75 |
| 15 | | 194.6459 | (ASP) | 0.035 | | | | |
| 16 | Lens 7 | 2.4354 | (ASP) | 0.847 | Plastic | 1.544 | 56.0 | 7.37 |
| 17 | | 5.4418 | (ASP) | 1.596 | | | | |
| 18 | Lens 8 | 70.3494 | (ASP) | 0.762 | Plastic | 1.534 | 56.0 | −8.66 |
| 19 | | 4.3257 | (ASP) | 0.500 | | | | |
| 20 | IR-cut filter | Plano | | 0.210 | Glass | 1.517 | 64.2 | — |
| 21 | | Plano | | 0.619 | | | | |
| 22 | Image | Plano | | 0.000 | | | | |

Note:

Reference wavelength is 587.6 nm (d-line).

An effective radius of the stop S1 (Surface 8) is 1.870 mm.

An effective radius of the stop S2 (Surface 13) is 3.175 mm.

TABLE 8

| | Aspheric Coefficients | | | |
|---|---|---|---|---|
| Surface # | 2 | 3 | 4 | 5 |
| k= | 0.000000000E+00 | 0.000000000E+00 | 0.000000000E+00 | 0.000000000E+00 |
| A4= | 1.731232917E−04 | 5.109283045E−03 | −4.210033485E−03 | −8.981922565E−03 |
| A6= | 1.555054063E−04 | −4.842090307E−03 | −2.452422992E−03 | 9.337121505E−04 |
| A8= | −3.317391534E−04 | 4.560985974E−03 | 1.744203636E−03 | −1.667200187E−03 |
| A10= | 2.539485647E−04 | −2.689455697E−03 | −1.586144060E−05 | 2.210168429E−03 |
| A12= | −1.081636218E−04 | 1.000077704E−03 | −5.984370984E−04 | −1.672851703E−03 |
| A14= | 2.789339187E−05 | −2.317743459E−04 | 3.543133280E−04 | 7.241500054E−04 |
| A16= | −4.629494995E−06 | 3.183738645E−05 | −9.614393519E−05 | −1.814380884E−04 |
| A18= | 4.792495199E−07 | −2.211082893E−06 | 1.311613138E−05 | 2.446692886E−05 |
| A20= | −2.423144699E−08 | 4.520852726E−08 | −7.326068372E−07 | −1.371452742E−06 |

| Surface # | 6 | 7 | 9 | 10 |
|---|---|---|---|---|
| k= | 0.000000000E+00 | 0.000000000E+00 | 0.000000000E+00 | 0.000000000E+00 |
| A4= | 3.495833369E−03 | 8.310244087E−03 | 6.480681645E−04 | −5.166972135E−03 |
| A6= | −2.375895506E−03 | −2.309620889E−02 | −2.522623346E−02 | −4.987286135E−03 |
| A8= | 3.173737682E−03 | 2.634836017E−02 | 2.864494718E−02 | 4.069623772E−03 |
| A10= | −2.304738897E−03 | −1.760737026E−02 | −1.990463416E−02 | −1.805018084E−03 |
| A12= | 1.056782609E−03 | 7.436587566E−03 | 9.046693231E−03 | 4.525948956E−04 |
| A14= | −2.892687483E−04 | −1.963076257E−03 | −2.666148756E−03 | −2.464504054E−05 |
| A16= | 4.118573340E−05 | 2.921837070E−04 | 4.755307520E−04 | −1.870739805E−05 |
| A18= | −2.285604701E−06 | −1.851027130E−05 | −4.391827185E−05 | 5.373750548E−06 |
| A20= | — | — | 1.412296046E−06 | −4.599279810E−07 |

| Surface # | 11 | 12 | 14 | 15 |
|---|---|---|---|---|
| k= | 0.000000000E+00 | 0.000000000E+00 | 0.000000000E+00 | 0.000000000E+00 |
| A4= | −8.574710270E−03 | 1.554991013E−03 | 3.707368313E−02 | −2.564002172E−02 |
| A6= | −6.027024995E−03 | −1.711682824E−02 | −2.632882932E−02 | 3.893784760E−03 |
| A8= | 5.093605896E−03 | 1.968804771E−02 | 1.654885790E−02 | 3.222431701E−04 |
| A10= | −4.324329972E−03 | −1.709246146E−02 | −8.310106309E−03 | −3.377304235E−04 |
| A12= | 2.350191558E−03 | 1.030155287E−02 | 3.110532178E−03 | 1.077500472E−04 |
| A14= | −7.498606744E−04 | −4.351633349E−03 | −8.557764000E−04 | −2.404837158E−05 |
| A16= | 9.708488706E−05 | 1.294422848E−03 | 1.716899860E−04 | 3.882473678E−06 |
| A18= | 1.773790977E−05 | −2.694498659E−04 | −2.497789647E−05 | −4.522837465E−07 |
| A20= | −9.073919387E−06 | 3.838671448E−05 | 2.604397461E−06 | 3.824350193E−08 |
| A22= | 1.380538292E−06 | −3.563883463E−06 | −1.896621844E−07 | −2.307066282E−09 |
| A24= | −7.628641489E−08 | 1.942301338E−07 | 9.161164759E−09 | 9.359543085E−11 |
| A26= | — | −4.712477879E−09 | −2.637083539E−10 | −2.261871288E−12 |
| A28= | — | — | 3.422132646E−12 | 2.434967150E−14 |

| Surface # | 16 | 17 | 18 | 19 |
|---|---|---|---|---|
| k= | −1.000000000E+00 | 0.000000000E+00 | 0.000000000E+00 | −1.000000000E+00 |
| A4= | −3.982174234E−02 | 1.854786552E−02 | −2.722703853E−02 | −2.949412139E−02 |
| A6= | 1.192220379E−02 | −9.318403715E−03 | 2.361128881E−03 | 3.662431940E−03 |
| A8= | −4.883247163E−03 | 1.600617925E−03 | 2.102764101E−04 | −3.435861522E−04 |
| A10= | 1.389924301E−03 | −1.313989061E−04 | −6.412942654E−05 | 1.970238301E−05 |
| A12= | −2.669618731E−04 | −1.777286735E−06 | 3.327890294E−06 | 2.458900294E−07 |
| A14= | 3.529902603E−05 | 1.687421678E−06 | 4.272173039E−07 | −2.090657259E−07 |
| A16= | −3.245545582E−06 | −1.989841720E−07 | −7.738769936E−08 | 2.402086358E−08 |
| A18= | 2.056511415E−07 | 1.270434120E−08 | 5.690766183E−09 | −1.500088262E−09 |
| A20= | −8.714159757E−09 | −4.886795906E−10 | −2.467281613E−10 | 5.700379480E−11 |
| A22= | 2.328416622E−10 | 1.097842812E−11 | 6.762741801E−12 | −1.310680018E−12 |
| A24= | −3.492239467E−12 | −1.213676703E−13 | −1.158256434E−13 | 1.622878688E−14 |
| A26= | 2.191955171E−14 | 2.015894686E−16 | 1.137183912E−15 | −5.210435198E−17 |
| A28= | — | 4.957497281E−18 | −4.903697530E−18 | −1.003338921E−18 |
| A30= | — | — | — | 8.723653548E−21 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.68 | ΣAT/(T56 + T78) | 1.45 |
| Fno | 1.98 | ImgH/BL | 6.15 |
| HFOV [deg.] | 42.7 | TL/ImgH | 1.25 |
| CRA_1.0Y [deg.] | 36.68 | f/|R1| + f/|R2| | 3.00 |
| V3 + V5 | 112.0 | f/|R3| + f/|R4| | 3.87 |
| V6 | 37.4 | f/|R5| + f/|R6| | 0.82 |
| Vmin | 19.5 | f/|R7| + f/|R8| | 0.32 |
| V1/V6 | 1.50 | f/|R9| + f/|R10| | 0.85 |
| V6/N6 | 23.91 | f/|R11| + f/|R12| | 1.30 |
| V6/(Vmax − Vmin) | 1.02 | f/|R13| + f/|R14| | 5.16 |
| Dr9r16/Dr1r8 | 1.97 | f/|R15| + f/|R16| | 2.13 |
| T78/T45 | 2.67 | |R16/R15| | 0.06 |
| T78/BL | 1.20 | |f7/f8| | 0.85 |
| ΣAT/T78 | 2.29 | — | — |

5th Embodiment

Figure 9:
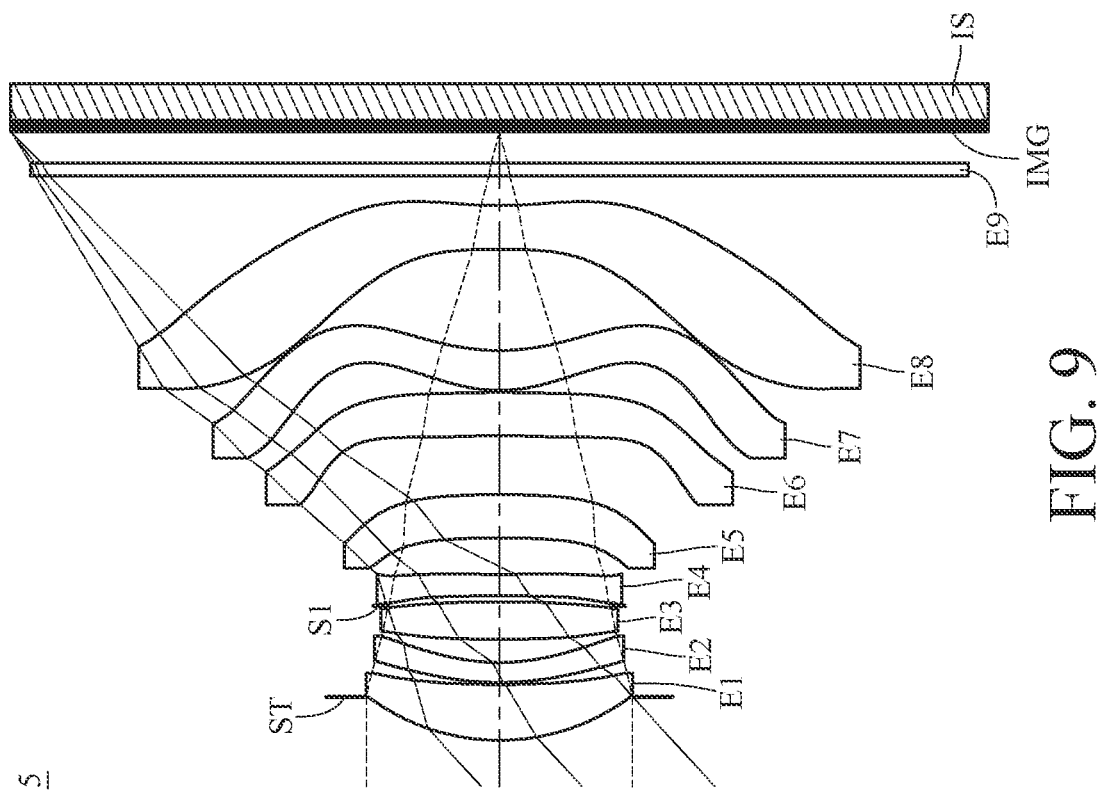
FIG. 9 is a schematic view of an image capturing unit according to the 5th embodiment of the present disclosure.
Figure 10:
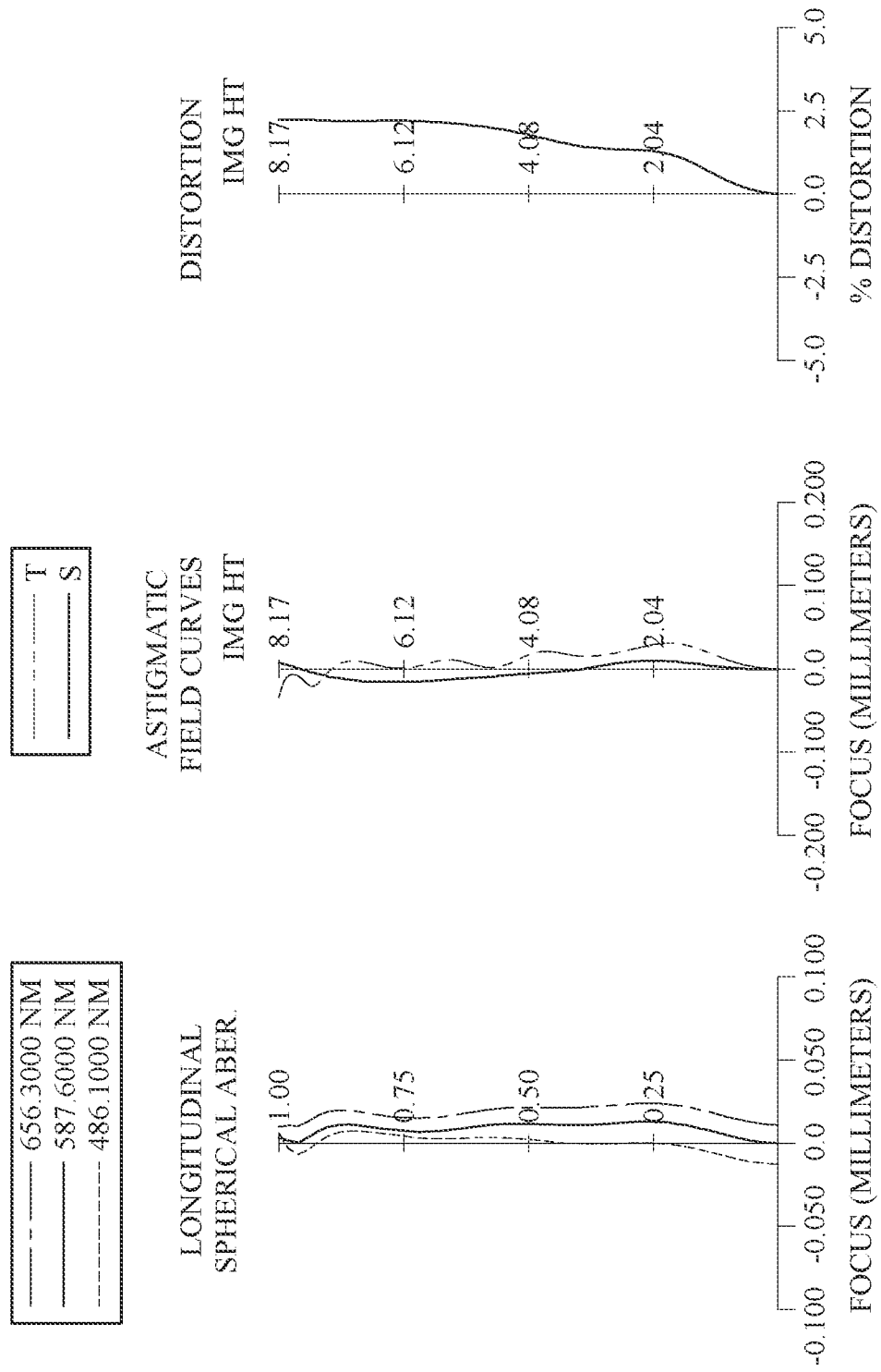
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a third lens element E3, a stop S1, a fourth lens element E4, a fifth lens element E5, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 5th embodiment are shown in Table 9 and the aspheric surface data are shown in Table 10 below.

TABLE 9

| 5th Embodiment | | | | | | | |
|---|---|---|---|---|---|---|---|
| f = 8.69 mm, Fno = 1.95, HFOV = 42.6 deg. | | | | | | | |
| Surface # | | Curvature Radius | | Thickness | Material | Index Abbe # | Focal Length |
| 0 | Object | Plano | | Infinity | | | |
| 1 | Ape. Stop | Plano | | −0.7291 | | | |
| 2 | Lens 1 | 3.6616 | (ASP) | 0.9323 | Plastic | 1.545 56.1 | 8.44 |
| 3 | | 16.3246 | (ASP) | 0.0350 | | | |
| 4 | Lens 2 | 4.8115 | (ASP) | 0.3350 | Plastic | 1.669 19.5 | −21.24 |

TABLE 9-continued

5th Embodiment f = 8.69 mm, Fno = 1.95, HFOV = 42.6 deg.

| Surface # | | Curvature Radius | | Thickness | Material | Index | Abbe # | Focal Length |
|---|---|---|---|---|---|---|---|---|
| 5 | | 3.4941 | (ASP) | 0.3870 | | | | |
| 6 | Lens 3 | 21.1818 | (ASP) | 0.6269 | Plastic | 1.544 | 56.0 | 20.49 |
| 7 | | −23.2880 | (ASP) | −0.0641 | | | | |
| 8 | Stop | Plano | | 0.1656 | | | | |
| 9 | Lens 4 | −89.3312 | (ASP) | 0.3600 | Plastic | 1.669 | 19.5 | −45.92 |
| 10 | | 46.8943 | (ASP) | 0.6089 | | | | |
| 11 | Lens 5 | −18.3767 | (ASP) | 0.7266 | Plastic | 1.544 | 56.0 | 203.86 |
| 12 | | −15.9842 | (ASP) | 0.9861 | | | | |
| 13 | Lens 6 | −10.2689 | (ASP) | 0.7227 | Plastic | 1.566 | 37.4 | −36.36 |
| 14 | | −21.0147 | (ASP) | 0.0350 | | | | |
| 15 | Lens 7 | 2.4885 | (ASP) | 0.6647 | Plastic | 1.544 | 56.0 | 13.31 |
| 16 | | 3.4353 | (ASP) | 1.6968 | | | | |
| 17 | Lens 8 | −15.6126 | (ASP) | 0.7310 | Plastic | 1.534 | 56.0 | −8.38 |
| 18 | | 6.3785 | (ASP) | 0.5000 | | | | |
| 19 | IR-cut filter | Plano | | 0.2100 | Glass | 1.517 | 64.2 | — |
| 20 | | Plano | | 0.5260 | | | | |
| 21 | Image | Plano | | 0.0000 | | | | |

Note:
Reference wavelength is 587.6 nm (d-line).
An effective radius of the stop S1 (Surface 8) is 1.912 mm.
An effective radius of the object-side surface of the sixth lens element E6 (Surface 13) is 3.330 mm.

TABLE 10

Aspheric Coefficients

| Surface # | 2 | 3 | 4 | 5 |
|---|---|---|---|---|
| k= | 0.000000000E+00 | 0.000000000E+00 | 0.000000000E+00 | 0.000000000E+00 |
| A4= | −1.303489246E−04 | 5.707588326E−03 | −6.532677582E−03 | −1.206357268E−02 |
| A6= | 6.815462362E−04 | −5.099444777E−03 | −1.723699280E−03 | 1.304890008E−03 |
| A8= | −9.084183408E−04 | 5.345758231E−03 | 1.988517460E−03 | −1.166020335E−03 |
| A10= | 6.434873159E−04 | −3.647931137E−03 | −9.082868391E−04 | 1.438092309E−03 |
| A12= | −2.747277641E−04 | 1.582003635E−03 | 5.194293986E−05 | −1.209262815E−03 |
| A14= | 7.322195078E−05 | −4.314670146E−04 | 1.145327989E−04 | 5.622795171E−04 |
| A16= | −1.214009053E−05 | 7.178034427E−05 | −4.614111431E−05 | −1.450887224E−04 |
| A18= | 1.171431985E−06 | −6.591081669E−06 | 7.472155204E−06 | 1.967291158E−05 |
| A20= | −5.157432042E−08 | 2.490171667E−07 | −4.630081128E−07 | −1.096993420E−06 |

| Surface # | 6 | 7 | 9 | 10 |
|---|---|---|---|---|
| k= | 0.000000000E+00 | 0.000000000E+00 | 0.000000000E+00 | 0.000000000E+00 |
| A4= | 2.189233591E−03 | −2.200162715E−03 | −9.030218668E−03 | −6.797493911E−03 |
| A6= | 1.427171095E−03 | −8.634478199E−04 | −2.753038647E−03 | −1.890981804E−04 |
| A8= | −1.198372277E−03 | 1.312280197E−03 | 2.568080768E−03 | −9.848224603E−04 |
| A10= | 1.043118850E−03 | −4.828617543E−04 | −1.696200262E−03 | 1.439856256E−03 |
| A12= | −5.296616348E−04 | −1.658694020E−05 | 9.168785396E−04 | −9.512064342E−04 |
| A14= | 1.402185395E−04 | 4.384269825E−05 | −3.909664412E−04 | 3.751409754E−04 |
| A16= | −1.455913926E−05 | −9.119873873E−06 | 1.101628602E−04 | −8.801487722E−05 |
| A18= | −9.779366261E−07 | 5.753998547E−07 | −1.631662674E−05 | 1.182270803E−05 |
| A20= | 2.326136662E−07 | — | 9.401430331E−07 | −6.972233816E−07 |

| Surface # | 11 | 12 | 13 | 14 |
|---|---|---|---|---|
| k= | 0.000000000E+00 | 0.000000000E+00 | 0.000000000E+00 | 0.000000000E+00 |
| A4= | −6.971120744E−03 | −1.355896366E−02 | 4.319282144E−02 | 1.416543708E−02 |
| A6= | −8.372216300E−03 | −1.147214136E−02 | −2.500206290E−02 | −9.249509812E−03 |
| A8= | 9.591931741E−03 | 8.689549355E−03 | 1.124973549E−02 | 2.971944286E−03 |
| A10= | −8.722387244E−03 | −5.026960793E−03 | −4.102961233E−03 | −7.302941596E−04 |
| A12= | 5.294233485E−03 | 2.048800629E−03 | 1.117013558E−03 | 1.443317982E−04 |
| A14= | −2.172574340E−03 | −5.877516412E−04 | −2.189205586E−04 | −2.327617065E−05 |
| A16= | 5.908624796E−04 | 1.169344362E−04 | 2.987134171E−05 | 3.000165919E−06 |
| A18= | −1.019993250E−04 | −1.566279469E−05 | −2.735288666E−06 | −3.075244236E−07 |
| A20= | 1.010890692E−05 | 1.333846962E−06 | 1.578884133E−07 | 2.466424911E−08 |
| A22= | −4.346874526E−07 | −6.419246207E−08 | −5.014657813E−09 | −1.455667119E−09 |

TABLE 10-continued

| Aspheric Coefficients | | | | |
|---|---|---|---|---|
| A24= | — | 1.302252497E−09 | 5.601621633E−11 | 5.730742502E−11 |
| A26= | — | — | 4.929790266E−13 | −1.307934256E−12 |
| A28= | — | — | — | 1.287532213E−14 |

| Surface # | 15 | 16 | 17 | 18 |
|---|---|---|---|---|
| k= | −1.000000000E+00 | −1.000000000E+00 | 0.000000000E+00 | 0.000000000E+00 |
| A4= | −3.368652055E−02 | −1.756270123E−02 | −2.957582978E−02 | −2.689362746E−02 |
| A6= | 9.602252314E−03 | 5.883872450E−03 | 9.571844436E−04 | 2.193513772E−03 |
| A8= | −3.728094340E−03 | −2.535321988E−03 | 9.980366028E−04 | 2.985134522E−05 |
| A10= | 9.231582990E−04 | 5.598568725E−04 | −2.803820943E−04 | −4.195528632E−05 |
| A12= | −1.651007278E−04 | −6.953012718E−05 | 4.099245200E−05 | 7.191518249E−06 |
| A14= | 2.312701405E−05 | 4.177531813E−06 | −3.811436953E−06 | −7.155287556E−07 |
| A16= | −2.527807856E−06 | 8.940390522E−08 | 2.392515854E−07 | 4.694960272E−08 |
| A18= | 2.034286943E−07 | −3.992613133E−08 | −1.035101372E−08 | −2.096346814E−09 |
| A20= | −1.126527770E−08 | 3.636247970E−09 | 3.067642189E−10 | 6.350426155E−11 |
| A22= | 3.994164069E−10 | −1.820594181E−10 | −5.980739049E−12 | −1.260417580E−12 |
| A24= | −8.102843265E−12 | 5.417114711E−12 | 6.824841086E−14 | 1.489980755E−14 |
| A26= | 7.127685167E−14 | −8.989244508E−14 | −2.741679243E−16 | −7.533442743E−17 |
| A28= | — | 6.422990913E−16 | −2.529690420E−18 | −2.439521354E−19 |
| A30= | — | — | 2.507730019E−20 | 3.390269991E−21 |

In the 5th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 8.69 | ΣAT/(T56 + T78) | 1.44 |
| Fno | 1.95 | ImgH/BL | 6.61 |
| HFOV [deg.] | 42.6 | TL/ImgH | 1.25 |
| CRA__1.0Y [deg.] | 37.01 | f/|R1| + f/|R2| | 2.90 |
| V3 + V5 | 112.0 | f/|R3| + f/|R4| | 4.29 |
| V6 | 37.4 | f/|R5| + f/|R6| | 0.78 |
| Vmin | 19.5 | f/|R7| + f/|R8| | 0.28 |
| V1/V6 | 1.50 | f/|R9| + f/|R10| | 1.02 |
| V6/N6 | 23.91 | f/|R11| + f/|R12| | 1.26 |
| V6/(Vmax − Vmin) | 1.02 | f/|R13| + f/|R14| | 6.02 |
| Dr9r16/Dr1r8 | 2.00 | f/|R15| + f/|R16| | 1.92 |
| T78/T45 | 2.79 | |R16/R15| | 0.41 |
| T78/BL | 1.37 | |f7/f8| | 1.59 |
| ΣAT/T78 | 2.27 | — | — |

6th Embodiment

Figure 11:
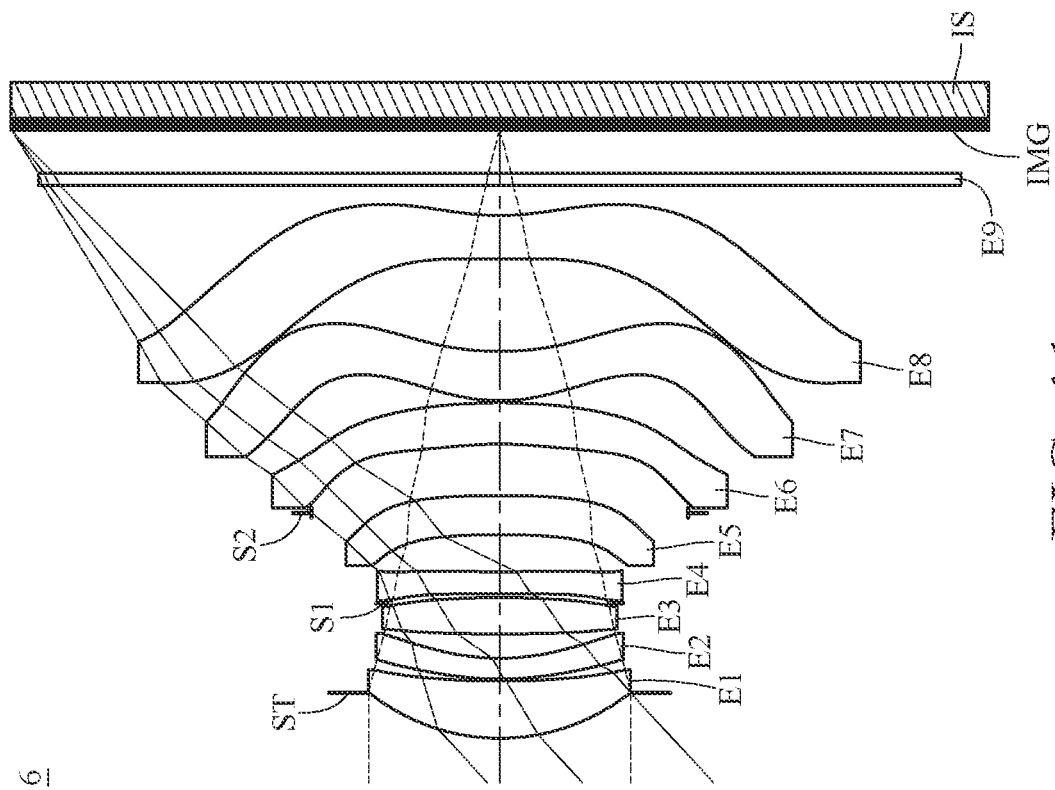
FIG. 11 is a schematic view of an image capturing unit according to the 6th embodiment of the present disclosure.
Figure 12:
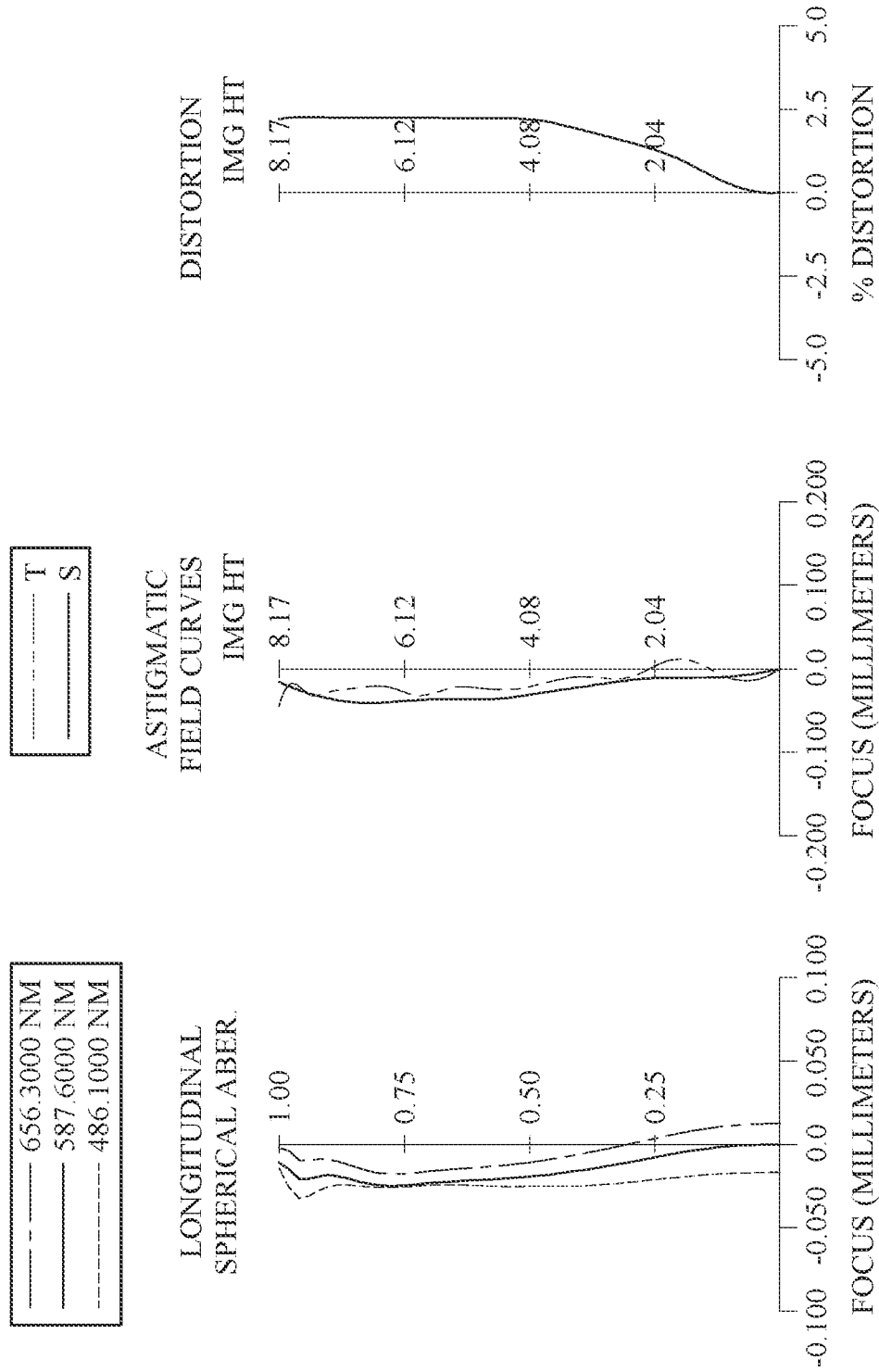
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a third lens element E3, a stop S1, a fourth lens element E4, a fifth lens element E5, a stop S2, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 6th embodiment are shown in Table 11 and the aspheric surface data are shown in Table 12 below.

TABLE 11

6th Embodiment f = 8.69 mm, Fno = 1.98, HFOV = 42.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.757 | | | | |
| 2 | Lens 1 | 3.4906 | (ASP) | 0.958 | Plastic | 1.545 | 56.1 | 8.26 |
| 3 | | 14.0343 | (ASP) | 0.035 | | | | |
| 4 | Lens 2 | 5.3429 | (ASP) | 0.347 | Plastic | 1.669 | 19.5 | −22.30 |
| 5 | | 3.8314 | (ASP) | 0.409 | | | | |
| 6 | Lens 3 | 39.5585 | (ASP) | 0.608 | Plastic | 1.544 | 56.0 | 21.26 |
| 7 | | −16.2554 | (ASP) | −0.095 | | | | |
| 8 | Stop | Plano | | 0.159 | | | | |
| 9 | Lens 4 | 204.8407 | (ASP) | 0.368 | Plastic | 1.669 | 19.5 | −51.19 |
| 10 | | 29.3194 | (ASP) | 0.619 | | | | |
| 11 | Lens 5 | −16.5095 | (ASP) | 0.658 | Plastic | 1.544 | 56.0 | 20583.57 |
| 12 | | −16.7167 | (ASP) | −0.290 | | | | |
| 13 | Stop | Plano | | 1.153 | | | | |
| 14 | Lens 6 | −5.6408 | (ASP) | 0.691 | Plastic | 1.566 | 37.4 | −28.34 |
| 15 | | −9.0853 | (ASP) | 0.035 | | | | |
| 16 | Lens 7 | 3.0124 | (ASP) | 0.823 | Plastic | 1.544 | 56.0 | 12.44 |
| 17 | | 4.9065 | (ASP) | 1.547 | | | | |
| 18 | Lens 8 | 24.6648 | (ASP) | 0.730 | Plastic | 1.534 | 56.0 | −9.22 |
| 19 | | 4.0633 | (ASP) | 0.500 | | | | |
| 20 | IR-cut filter | Plano | | 0.210 | Glass | 1.517 | 64.2 | — |
| 21 | | Plano | 0.720 | | | | | |
| 22 | Image | Plano | 0.000 | | | | | |

Note:
Reference wavelength is 587.6 nm (d-line).
An effective radius of the stop S1 (Surface 8) is 1.880 mm.
An effective radius of the stop S2 (Surface 13) is 3.150 mm.

TABLE 12

Aspheric Coefficients

| Surface # | 2 | 3 | 4 | 5 |
|---|---|---|---|---|
| k= | 0.000000000E+00 | 0.000000000E+00 | 0.000000000E+00 | 0.000000000E+00 |
| A4= | 1.408144803E−04 | −4.349734069E−04 | −8.773152749E−03 | −8.904791351E−03 |
| A6= | 2.032859284E−04 | 2.924841533E−03 | 4.349999824E−03 | 1.833816253E−03 |
| A8= | −4.128420108E−04 | −3.983942417E−03 | −6.034098651E−03 | −3.144254273E−03 |
| A10= | 3.217008237E−04 | 3.546919694E−03 | 5.904120287E−03 | 3.702530065E−03 |
| A12= | −1.444843443E−04 | −1.973609187E−03 | −3.546644692E−03 | −2.585905297E−03 |
| A14= | 3.933404096E−05 | 6.810986193E−04 | 1.302693866E−03 | 1.067845650E−03 |
| A16= | −6.723021428E−06 | −1.414700124E−04 | −2.851183206E−04 | −2.594977665E−04 |
| A18= | 6.857881976E−07 | 1.628406094E−05 | 3.430194948E−05 | 3.439519667E−05 |
| A20= | −3.268618310E−08 | −8.032318045E−07 | −1.754678942E−06 | −1.920404213E−06 |

| Surface # | 6 | 7 | 9 | 10 |
|---|---|---|---|---|
| k= | 0.000000000E+00 | 0.000000000E+00 | 0.000000000E+00 | 0.000000000E+00 |
| A4= | 2.325189137E−03 | −2.626139784E−03 | −9.142741351E−03 | −6.139041626E−03 |
| A6= | −3.258438268E−04 | −5.247224264E−03 | −7.735241879E−03 | −3.259969594E−03 |
| A8= | 8.285233322E−04 | 8.307102100E−03 | 1.054950228E−02 | 3.399495058E−03 |
| A10= | −6.370068749E−04 | −6.080439133E−03 | −8.083059461E−03 | −2.190771521E−03 |
| A12= | 3.440217350E−04 | 2.774406255E−03 | 4.157434795E−03 | 9.972983040E−04 |

TABLE 12-continued

| Aspheric Coefficients | | | | |
|---|---|---|---|---|
| A14= | −1.184293242E−04 | −8.221425737E−04 | −1.436297216E−03 | −2.913312805E−04 |
| A16= | 2.065145445E−05 | 1.395221281E−04 | 3.029232128E−04 | 4.861338915E−05 |
| A18= | −1.362440498E−06 | −9.980884009E−06 | −3.295722544E−05 | −3.344417877E−06 |
| A20= | — | — | 1.289376550E−06 | — |

| Surface # | 11 | 12 | 14 | 15 |
|---|---|---|---|---|
| k= | 0.000000000E+00 | 0.000000000E+00 | 0.000000000E+00 | 0.000000000E+00 |
| A4= | −6.953877072E−03 | 1.611773568E−03 | 3.669174645E−02 | 6.567103020E−03 |
| A6= | −7.100470630E−03 | −9.821018902E−03 | −1.425398530E−02 | −3.401205046E−03 |
| A8= | 7.648972902E−03 | 7.705309134E−03 | 4.085519081E−03 | −1.051057804E−03 |
| A10= | −8.120917112E−03 | −5.469232272E−03 | −7.549781893E−04 | 1.483927931E−03 |
| A12= | 5.757849701E−03 | 2.764156884E−03 | 1.036365254E−05 | −6.537123738E−04 |
| A14= | −2.694317001E−03 | −9.699641579E−04 | 3.912078407E−05 | 1.697097596E−04 |
| A16= | 8.180131536E−04 | 2.328953841E−04 | −1.280664499E−05 | −2.955790044E−05 |
| A18= | −1.548732134E−04 | −3.731827529E−05 | 2.254568203E−06 | 3.590229470E−06 |
| A20= | 1.655800657E−05 | 3.794498971E−06 | −2.449368468E−07 | −3.046469070E−07 |
| A22= | −7.573026026E−07 | −2.201582485E−07 | 1.629600829E−08 | 1.767403520E−08 |
| A24= | — | 5.527343728E−09 | −6.074242654E−10 | −6.673365998E−10 |
| A26= | — | — | 9.691081700E−12 | 1.477084108E−11 |
| A28= | — | — | — | −1.454098141E−13 |

| Surface # | 16 | 17 | 18 | 19 |
|---|---|---|---|---|
| k= | −1.000000000E+00 | −1.000000000E+00 | 0.000000000E+00 | −1.000000000E+00 |
| A4= | −1.467931472E−02 | 6.816808313E−03 | −2.635188414E−02 | −2.866706849E−02 |
| A6= | −9.683498858E−05 | −2.164439338E−03 | 1.418810322E−03 | 2.973143873E−03 |
| A8= | −2.775636814E−05 | −7.315502408E−04 | 6.265966772E−04 | −9.329932576E−05 |
| A10= | −1.168107711E−04 | 3.608764133E−04 | −1.928812839E−04 | −3.718836092E−05 |
| A12= | 6.941717199E−05 | −7.379926312E−05 | 2.793019887E−05 | 8.281651858E−06 |
| A14= | −1.754880040E−05 | 9.347322719E−06 | −2.522513301E−06 | −9.367533208E−07 |
| A16= | 2.549323721E−06 | −8.095217318E−07 | 1.541105916E−07 | 6.759323165E−08 |
| A18= | −2.330329165E−07 | 4.966474679E−08 | −6.560056855E−09 | −3.254604999E−09 |
| A20= | 1.368455008E−08 | −2.174016538E−09 | 1.950807739E−10 | 1.045244053E−10 |
| A22= | −5.021250028E−10 | 6.686581711E−11 | −3.972379382E−12 | −2.160672888E−12 |
| A24= | 1.048489377E−11 | −1.380868337E−12 | 5.269686590E−14 | 2.587623291E−14 |
| A26= | −9.509607129E−14 | 1.726209779E−14 | −4.090933130E−16 | −1.176228447E−16 |
| A28= | — | −9.894803658E−17 | 1.403595488E−18 | −7.435127694E−19 |
| A30= | — | — | — | 8.050619067E−21 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 8.69 | ΣAT/(T56 + T78) | 1.48 |
| Fno | 1.98 | ImgH/BL | 5.71 |
| HFOV [deg.] | 42.7 | TL/ImgH | 1.25 |
| CRA_1.0Y [deg.] | 36.92 | f/|R1| + f/|R2| | 3.11 |
| V3 + V5 | 112.0 | f/|R3| + f/|R4| | 3.89 |
| V6 | 37.4 | f/|R5| + f/|R6| | 0.75 |
| Vmin | 19.5 | f/|R7| + f/|R8| | 0.34 |
| V1/V6 | 1.50 | f/|R9| + f/|R10| | 1.05 |
| V6/N6 | 23.91 | f/|R11| + f/|R12| | 2.50 |
| V6/(Vmax − Vmin) | 1.02 | f/|R13| + f/|R14| | 4.65 |
| Dr9r16/Dr1r8 | 1.92 | f/|R15| + f/|R16| | 2.49 |
| T78/T45 | 2.50 | |R16/R15| | 0.16 |
| T78/BL | 1.08 | |f7/f8| | 1.35 |
| ΣAT/T78 | 2.31 | — | — |

7th Embodiment

Figure 13:
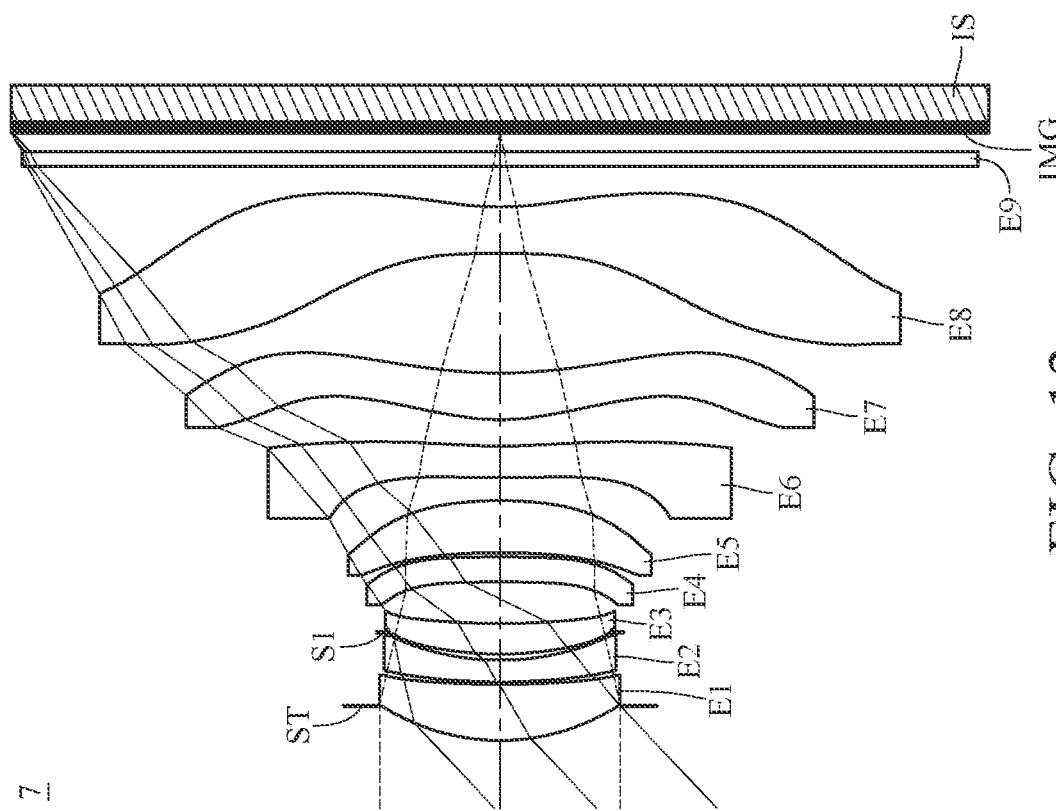
FIG. 13 is a schematic view of an image capturing unit according to the 7th embodiment of the present disclosure.
Figure 14:
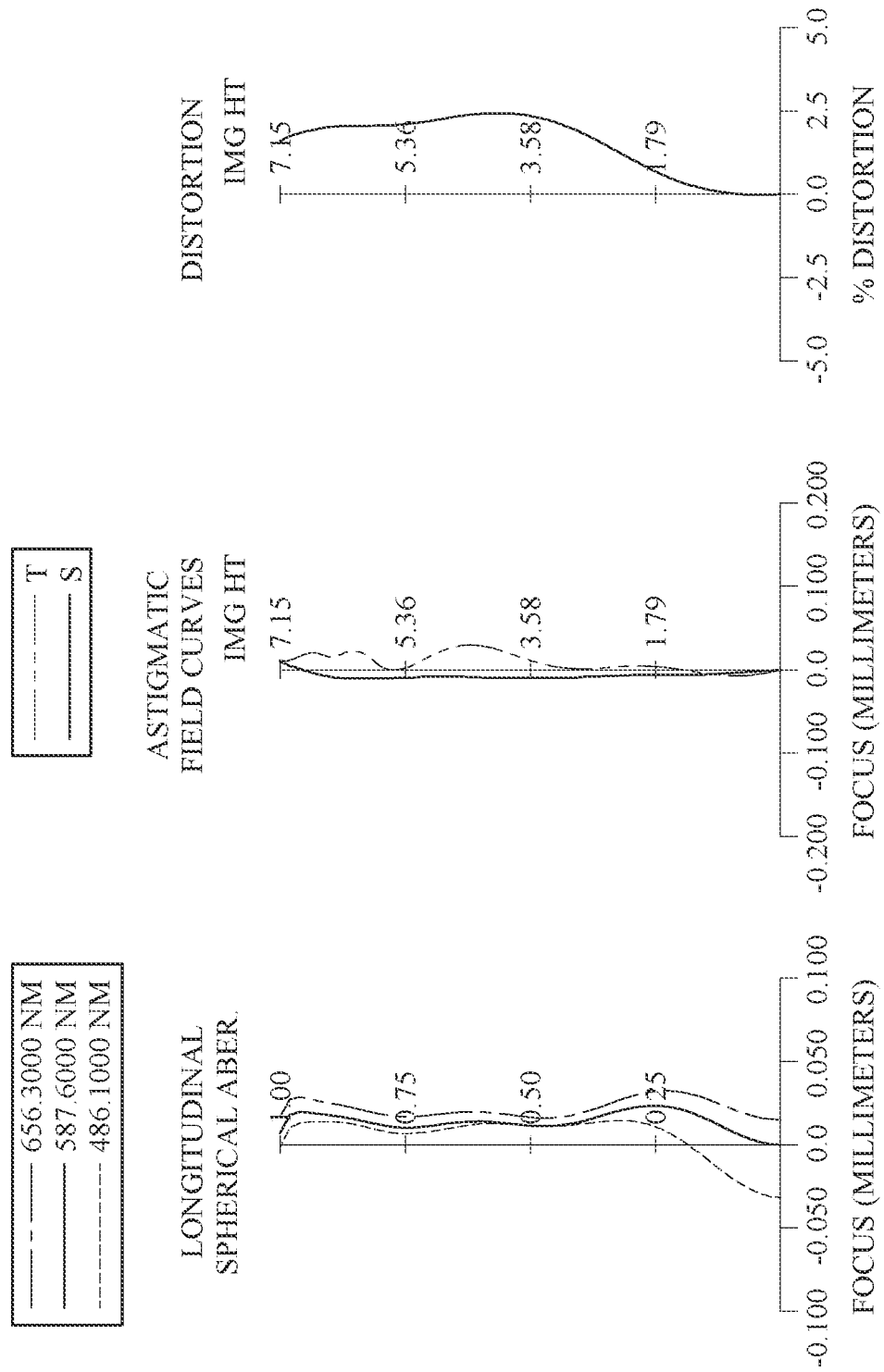
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a stop S1, a third lens element E3, a fourth lens element E4, a fifth lens element E5, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface MG, and will not affect the focal length of the imaging optical lens system. The image sensor IS is disposed on or near the image surface MG of the imaging optical lens system.

The detailed optical data of the 7th embodiment are shown in Table 13 and the aspheric surface data are shown in Table 14 below.

TABLE 13

7th Embodiment f = 7.46 mm, Fno = 2.12, HFOV = 43.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.508 | | | | |
| 2 | Lens 1 | 3.1720 | (ASP) | 0.825 | Plastic | 1.544 | 55.9 | 7.12 |
| 3 | | 15.9414 | (ASP) | 0.031 | | | | |
| 4 | Lens 2 | 8.8434 | (ASP) | 0.320 | Plastic | 1.614 | 26.0 | −10.66 |
| 5 | | 3.7090 | (ASP) | 0.406 | | | | |
| 6 | Stop | Plano | | −0.314 | | | | |
| 7 | Lens 3 | 5.3160 | (ASP) | 0.447 | Plastic | 1.544 | 55.9 | 17.81 |
| 8 | | 11.4347 | (ASP) | 0.608 | | | | |
| 10 | Lens 4 | −32.8353 | (ASP) | 0.366 | Plastic | 1.705 | 14.0 | 48.44 |
| 11 | | −16.8144 | (ASP) | 0.063 | | | | |
| 12 | Lens 5 | −6.7746 | (ASP) | 0.763 | Plastic | 1.544 | 55.9 | 29.01 |
| 13 | | −4.9269 | (ASP) | 0.339 | | | | |
| 14 | Lens 6 | −115.1666 | (ASP) | 0.460 | Plastic | 1.583 | 30.2 | −13.95 |
| 15 | | 8.7531 | (ASP) | 0.385 | | | | |
| 16 | Lens 7 | 3.1368 | (ASP) | 0.683 | Plastic | 1.544 | 55.9 | 10.39 |
| 17 | | 6.5158 | (ASP) | 1.753 | | | | |
| 18 | Lens 8 | −38.5292 | (ASP) | 0.680 | Plastic | 1.544 | 55.9 | −6.22 |
| 19 | | 3.7280 | (ASP) | 0.600 | | | | |
| 20 | IR-cut filter | Plano | | 0.210 | Glass | 1.517 | 64.2 | — |
| 21 | | Plano | | 0.272 | | | | |
| 22 | Image | Plano | | 0.000 | | | | |

Note:
Reference wavelength is 587.6 nm (d-line).

An effective radius of the stop S1 (Surface 6) is 1.640 mm.

An effective radius of the image-side surface of the third lens element E3 (Surface 8) is 1.680 mm.

TABLE 14

| Aspheric Coefficients | | | | |
|---|---|---|---|---|
| Surface # | 2 | 3 | 4 | 5 |
| k= | 8.024879361E−02 | 1.866759174E+01 | 0.000000000E+00 | −1.024338117E+00 |
| A4= | −2.009611134E−03 | −1.232228579E−02 | −1.949322074E−02 | −9.086800226E−03 |
| A6= | 1.938950024E−03 | 3.194802545E−02 | 4.357451322E−02 | 1.556852816E−02 |
| A8= | −2.583460754E−03 | −3.590235856E−02 | −5.210625856E−02 | −1.313967370E−02 |
| A10= | 1.828137050E−03 | 2.344544048E−02 | 3.788158783E−02 | 4.917667701E−03 |
| A12= | −7.456044464E−04 | −8.896228680E−03 | −1.691835830E−02 | 7.791920132E−04 |
| A14= | 1.624404503E−04 | 1.861727634E−03 | 4.546100042E−03 | −1.194230936E−03 |
| A16= | −1.425934738E−05 | −1.664638300E−04 | −6.636993239E−04 | 3.391898722E−04 |
| A18= | — | — | 3.907428987E−05 | −3.274563849E−05 |
| Surface # | 7 | 8 | 9 | 10 |
| k= | 0.000000000E+00 | 0.000000000E+00 | 0.000000000E+00 | 0.000000000E+00 |
| A4= | −3.760898548E−03 | −1.444784128E−03 | −1.611489705E−02 | 5.844449250E−02 |
| A6= | 6.601099877E−03 | −2.583494074E−03 | −1.527386096E−02 | −1.477223060E−01 |
| A8= | −1.760028479E−03 | 5.137194978E−03 | 1.294076529E−02 | 1.548415099E−01 |
| A10= | −2.783786127E−03 | −4.055373272E−03 | −6.876380048E−03 | −1.035515928E−01 |
| A12= | 4.256737794E−03 | 2.246640262E−03 | 7.940509566E−04 | 4.523710787E−02 |
| A14= | −2.075811739E−03 | −6.637971609E−04 | 8.300084300E−04 | −1.283350503E−02 |
| A16= | 4.449350144E−04 | 9.280827084E−05 | −3.645863237E−04 | 2.267477344E−03 |
| A18= | −3.541837085E−05 | −2.970365424E−06 | 4.481474751E−05 | −2.260055273E−04 |
| A20= | — | — | — | 9.733762616E−06 |
| Surface # | 11 | 12 | 13 | 14 |
| k= | 0.000000000E+00 | 0.000000000E+00 | 9.900000000E+01 | −2.213550604E+01 |
| A4= | 1.056118963E−01 | 4.004891917E−02 | 4.560552397E−02 | −1.629089293E−02 |
| A6= | −2.031076562E−01 | −7.171387216E−02 | −6.882833454E−02 | 2.342955681E−03 |
| A8= | 2.054239961E−01 | 5.211939726E−02 | 5.163308520E−02 | 3.297233974E−03 |
| A10= | −1.318117794E−01 | −2.412473351E−02 | −2.875259361E−02 | 5.677662508E−06 |
| A12= | 5.593114074E−02 | 7.332798597E−03 | 1.228111088E−02 | −2.202625040E−05 |
| A14= | −1.562952555E−02 | −1.426040645E−03 | −3.959089392E−03 | 5.440015914E−06 |
| A16= | 2.746256775E−03 | 1.631326883E−04 | 9.316512578E−04 | −5.786598243E−07 |
| A18= | −2.724148096E−04 | −9.120699818E−06 | −1.536527506E−04 | 2.687465131E−08 |
| A20= | 1.153049429E−05 | 1.479195797E−07 | 1.671873556E−05 | −1.273486292E−11 |
| A22= | — | — | −1.073004502E−06 | −4.413471797E−11 |
| A24= | — | — | 3.064467694E−08 | 1.153484826E−12 |
| Surface # | 15 | 16 | 17 | 18 |
| k= | −1.068357450E+00 | −4.205212937E+00 | 0.000000000E+00 | −1.438146484E+01 |
| A4= | −5.019798547E−02 | −1.221945899E−02 | −4.515165906E−02 | −2.045665024E−02 |
| A6= | 2.281973607E−02 | 7.278402010E−03 | 1.473798954E−02 | 6.023199939E−03 |
| A8= | −9.832549028E−03 | −3.326093422E−03 | −3.647784157E−03 | −1.283473160E−03 |
| A10= | 3.221224187E−03 | 1.012182206E−03 | 6.483247400E−04 | 1.874668408E−04 |
| A12= | −7.761326961E−04 | −2.165121316E−04 | −8.024107530E−05 | −1.904739746E−05 |
| A14= | 1.355712144E−04 | 3.311503216E−05 | 7.044062136E−06 | 1.332261714E−06 |
| A16= | −1.706875630E−05 | −3.645592202E−06 | −4.479774927E−07 | −6.081169268E−08 |
| A18= | 1.538729559E−06 | 2.885995536E−07 | 2.088559855E−08 | 1.472904202E−09 |
| A20= | −9.797010473E−08 | −1.624961902E−08 | −7.143501271E−10 | 8.187465362E−12 |
| A22= | 4.288634894E−09 | 6.339819360E−10 | 1.771739644E−11 | −2.013651469E−12 |
| A24= | −1.225960255E−10 | −1.626959211E−11 | −3.099165974E−13 | 7.386950403E−14 |
| A26= | 2.058752106E−12 | 2.466991955E−13 | 3.621900020E−15 | −1.402139215E−15 |
| A28= | −1.539718314E−14 | −1.672732267E−15 | −2.534815988E−17 | 1.423011065E−17 |
| A30= | — | — | 8.020717360E−20 | −6.120717487E−20 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 7.46 | ΣAT/(T56 + T78) | 1.56 |
| Fno | 2.12 | ImgH/BL | 6.61 |

-continued

| 7th Embodiment | | | |
|---|---|---|---|
| HFOV [deg.] | 43.3 | TL/ImgH | 1.24 |
| CRA_1.0Y [deg.] | 35.33 | f/|R1| + f/|R2| | 2.82 |
| V3 + V5 | 111.9 | f/|R3| + f/|R4| | 2.85 |
| V6 | 30.2 | f/|R5| + f/|R6| | 2.05 |
| Vmin | 14.0 | f/|R7| + f/|R8| | 0.67 |
| V1/V6 | 1.85 | f/|R9| + f/|R10| | 2.61 |
| V6/N6 | 19.11 | f/|R11| + f/|R12| | 0.92 |
| V6/(Vmax − Vmin) | 0.72 | f/|R13| + f/|R14| | 3.52 |
| Dr9r16/Dr1r8 | 1.88 | f/|R15| + f/|R16| | 2.19 |
| T78/T45 | 27.83 | |R16/R15| | 0.10 |

-continued

| 7th Embodiment | | | |
|---|---|---|---|
| T78/BL | 1.62 | \|f7/f8\| | 1.67 |
| ΣAT/T78 | 1.87 | — | — |

8th Embodiment

Figure 15:
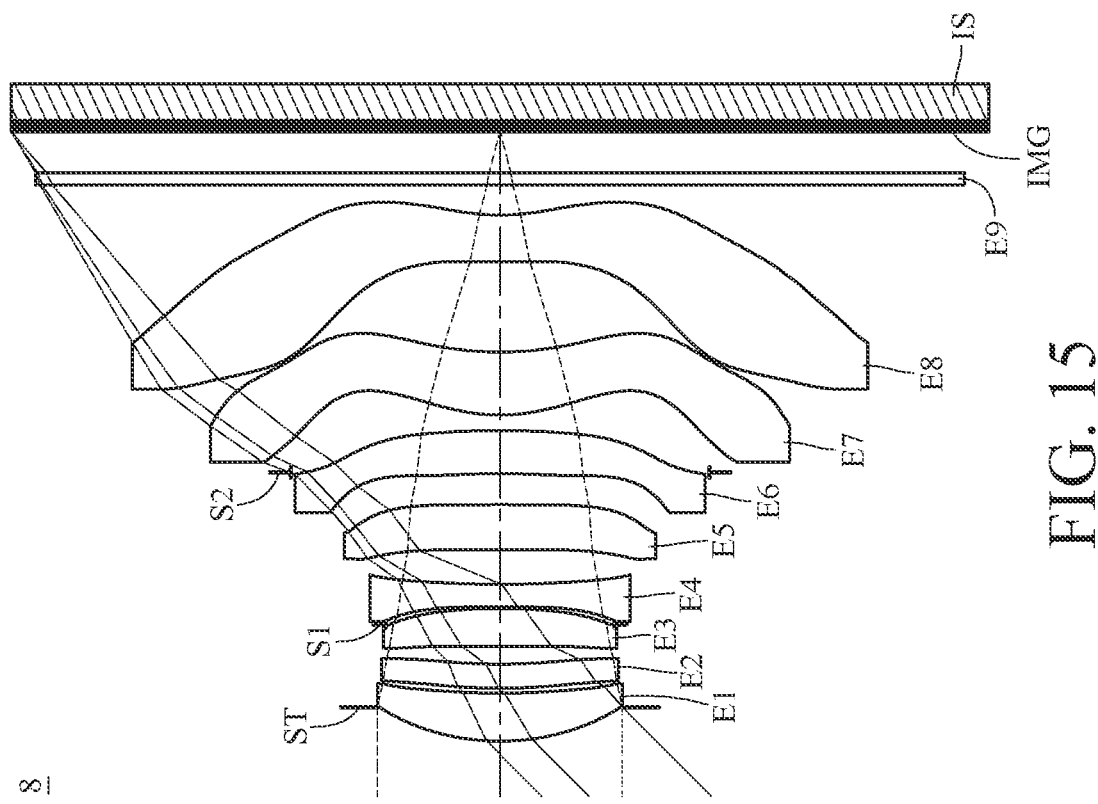
FIG. 15 is a schematic view of an image capturing unit according to the 8th embodiment of the present disclosure.
Figure 16:
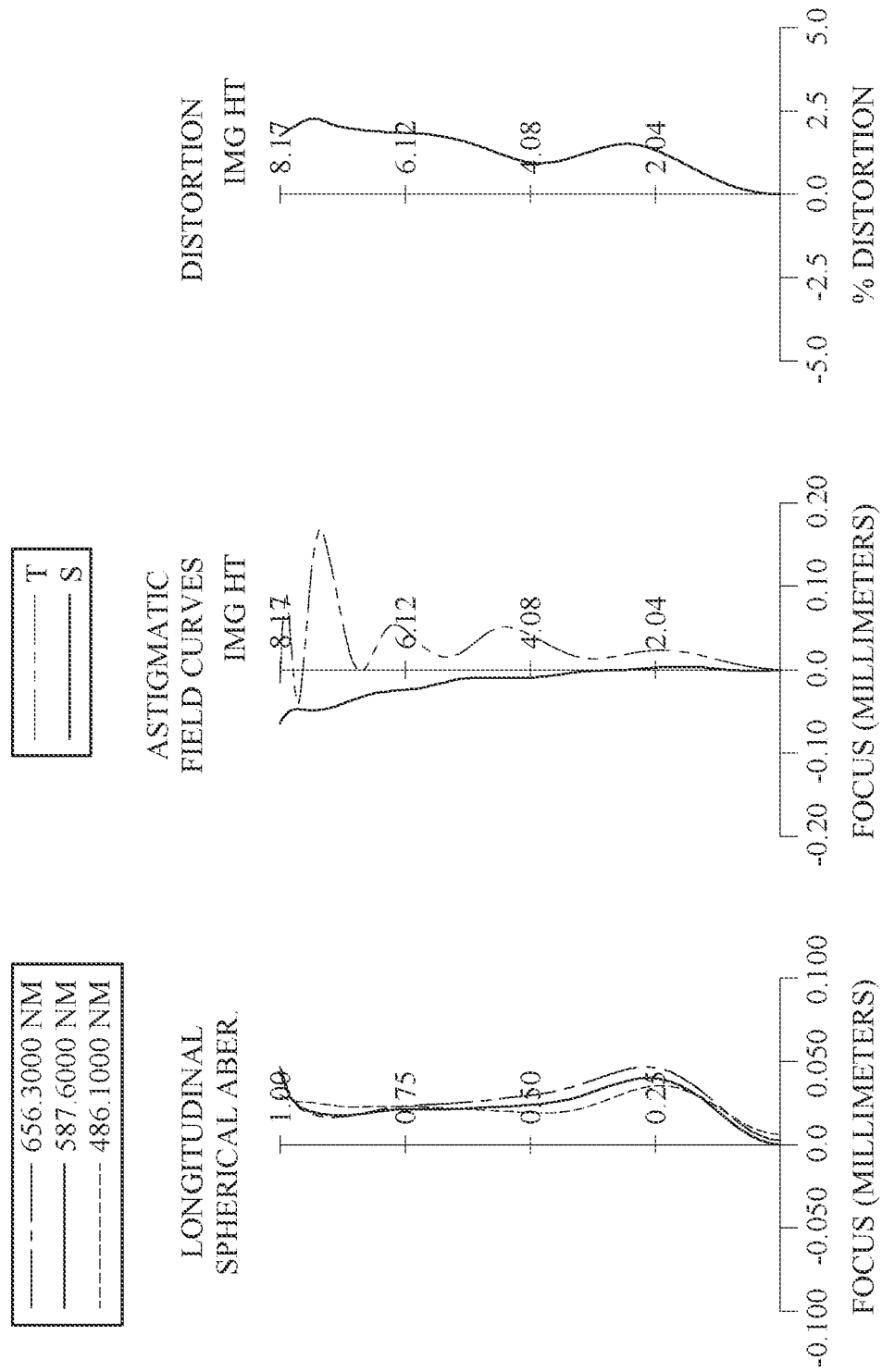
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a third lens element E3, a stop S1, a fourth lens element E4, a fifth lens element E5, a sixth lens element E6, a stop S2, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface IMG, and will not affect the focal length of the imaging optical lens system. The image sensor IS is disposed on or near the image surface IMG of the imaging optical lens system.

The detailed optical data of the 8th embodiment are shown in Table 15 and the aspheric surface data are shown in Table 16 below.

TABLE 15

8th Embodiment f = 8.10 mm, Fno = 1.98, HFOV = 44.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.573 | | | | |
| 2 | Lens 1 | 3.9561 | (ASP) | 0.806 | Plastic | 1.544 | 56.0 | 9.57 |
| 3 | | 15.2786 | (ASP) | 0.080 | | | | |
| 4 | Lens 2 | 9.5534 | (ASP) | 0.401 | Plastic | 1.713 | 12.4 | −161.85 |
| 5 | | 8.6690 | (ASP) | 0.302 | | | | |
| 6 | Lens 3 | 730.3100 | (ASP) | 0.631 | Plastic | 1.544 | 56.0 | 16.32 |
| 7 | | −8.9870 | (ASP) | −0.276 | | | | |
| 8 | Stop | Plano | | 0.311 | | | | |
| 9 | Lens 4 | −19.6033 | (ASP) | 0.368 | Plastic | 1.638 | 18.4 | −13.51 |
| 10 | | 15.4891 | (ASP) | 0.584 | | | | |
| 11 | Lens 5 | 2393.3543 | (ASP) | 0.751 | Glass | 1.658 | 36.9 | 71.22 |
| 12 | | −47.7955 | (ASP) | 0.522 | | | | |
| 13 | Lens 6 | −7.7592 | (ASP) | 0.715 | Plastic | 1.559 | 40.4 | −30.74 |
| 14 | | −14.6200 | (ASP) | −0.701 | | | | |
| 15 | Stop | Plano | | 0.962 | | | | |

TABLE 15-continued

8th Embodiment f = 8.10 mm, Fno = 1.98, HFOV = 44.7 deg.

| Surface # | | Curvature Radius | | Thickness | Material | Index | Abbe # | Focal Length |
|---|---|---|---|---|---|---|---|---|
| 16 | Lens 7 | 2.8780 | (ASP) | 1.052 | Plastic | 1.544 | 56.0 | 10.39 |
| 17 | | 5.1094 | (ASP) | 1.511 | | | | |
| 18 | Lens 8 | 15.0528 | (ASP) | 0.782 | Plastic | 1.534 | 56.0 | −8.01 |
| 19 | | 3.2728 | (ASP) | 0.500 | | | | |
| 20 | IR-cut filter | Plano | | 0.210 | Glass | 1.517 | 64.2 | — |
| 21 | | Plano | | 0.680 | | | | |
| 22 | Image | Plano | | 0.000 | | | | |

Note:
Reference wavelength is 587.6 nm (d-line).
An effective radius of the stop S1 (Surface 8) is 1.920 mm.
An effective radius of the stop S2 (Surface 15) is 3.500 mm.

TABLE 16

Aspheric Coefficients

| Surface # | 2 | 3 | 4 | 5 |
|---|---|---|---|---|
| k= | 0.000000000E+00 | 0.000000000E+00 | 0.000000000E+00 | 0.000000000E+00 |
| A4= | −5.764297197E−04 | 1.135183702E−02 | 7.515301858E−03 | 3.578370488E−04 |
| A6= | 2.544766672E−03 | −1.654246356E−02 | −1.575681335E−02 | −1.048356779E−02 |
| A8= | −3.533977475E−03 | 1.369226288E−02 | 8.917529980E−03 | 4.911161377E−03 |
| A10= | 2.980923701E−03 | −8.293466835E−03 | −3.271447495E−03 | −1.359882639E−03 |
| A12= | −1.536442128E−03 | 3.826516238E−03 | 9.127866387E−04 | 1.371343230E−04 |
| A14= | 4.941337889E−04 | −1.261869005E−03 | −2.346054617E−04 | 4.677079359E−05 |
| A16= | −9.666454502E−05 | 2.750370051E−04 | 5.873045514E−05 | −1.130493578E−05 |
| A18= | 1.055699727E−05 | −3.484761400E−05 | −1.009388541E−05 | −6.301963375E−07 |
| A20= | −4.940576546E−07 | 1.920927873E−06 | 7.396777761E−07 | 2.208656250E−07 |

| Surface # | 6 | 7 | 9 | 10 |
|---|---|---|---|---|
| k= | 0.000000000E+00 | 0.000000000E+00 | 0.000000000E+00 | 0.000000000E+00 |
| A4= | 1.320121494E−03 | 1.840623196E−02 | 1.014016415E−02 | −2.349837187E−03 |
| A6= | −5.628660421E−03 | −3.602313332E−02 | −3.093943628E−02 | −3.028111258E−03 |
| A8= | 1.563061913E−03 | 2.948585924E−02 | 2.717587200E−02 | 4.424532678E−03 |
| A10= | 8.902587411E−05 | −1.641753324E−02 | −1.582773503E−02 | −2.739743277E−03 |
| A12= | −1.922377524E−04 | 6.089437137E−03 | 5.959087450E−03 | 9.674537586E−04 |
| A14= | 8.359781387E−05 | −1.442312181E−03 | −1.443579378E−03 | −2.037242209E−04 |
| A16= | −1.653244470E−05 | 1.990574062E−04 | 2.160972404E−04 | 2.565996506E−05 |
| A18= | 1.157492012E−06 | −1.218058691E−05 | −1.706672948E−05 | −1.746094730E−06 |
| A20= | — | — | 4.213936926E−07 | 4.451189019E−08 |

| Surface # | 11 | 12 | 13 | 14 |
|---|---|---|---|---|
| k= | 0.000000000E+00 | 0.000000000E+00 | 3.878761048E+00 | 0.000000000E+00 |
| A4= | −3.162633764E−05 | 1.903133039E−02 | 5.866533979E−02 | 5.121589893E−03 |
| A6= | −1.201903909E−02 | −2.999810268E−02 | −3.441522216E−02 | −3.632050536E−03 |
| A8= | 1.315044577E−02 | 3.067868431E−02 | 1.647324427E−02 | 2.359291692E−04 |
| A10= | −1.118022777E−02 | −2.703886084E−02 | −5.725606189E−03 | 4.719054495E−04 |
| A12= | 7.104998761E−03 | 1.736950437E−02 | 6.172584376E−04 | −4.248307245E−04 |
| A14= | −3.157698659E−03 | −7.803116204E−03 | 5.342142619E−04 | 2.008486591E−04 |
| A16= | 9.502213163E−04 | 2.439575341E−03 | −3.317030409E−04 | −5.813664669E−05 |
| A18= | −1.885869995E−04 | −5.277465323E−04 | 9.793133571E−05 | 1.079453749E−05 |
| A20= | 2.353937202E−05 | 7.738870556E−05 | −1.784571194E−05 | −1.309577439E−06 |
| A22= | −1.667102244E−06 | −7.334925585E−06 | 2.101186418E−06 | 1.033277107E−07 |
| A24= | 5.089863050E−08 | 4.049891369E−07 | −1.563889594E−07 | −5.115462880E−09 |
| A26= | — | −9.879009659E−09 | 6.712042853E−09 | 1.445134373E−10 |
| A28= | — | — | −1.267799850E−10 | −1.779574044E−12 |

| Surface # | 16 | 17 | 18 | 19 |
|---|---|---|---|---|
| k= | −1.000000000E+00 | 0.000000000E+00 | 0.000000000E+00 | −1.000000000E+00 |
| A4= | −3.056768329E−02 | −1.093001059E−02 | −4.305876248E−02 | −4.399906951E−02 |
| A6= | 1.099341538E−02 | 6.447419766E−03 | 4.794983592E−03 | 8.185514217E−03 |
| A8= | −4.440064997E−03 | −2.909678444E−03 | 9.445466028E−04 | −1.225893709E−03 |
| A10= | 1.098340344E−03 | 5.808204043E−04 | −5.815436933E−04 | 1.372484833E−04 |
| A12= | −2.035216803E−04 | −5.802545467E−05 | 1.196486427E−04 | −1.470226907E−05 |
| A14= | 3.215934078E−05 | 1.403181472E−06 | −1.378621824E−05 | 1.640199045E−06 |
| A16= | −4.239182719E−06 | 3.458737544E−07 | 1.010637614E−06 | −1.520036085E−07 |
| A18= | 4.166908051E−07 | −4.583927719E−08 | −4.967822084E−08 | 1.011744209E−08 |
| A20= | −2.775761186E−08 | 2.774324397E−09 | 1.665711911E−09 | −4.674577967E−10 |

TABLE 16-continued

| Aspheric Coefficients | | | |
|---|---|---|---|
| A22= | 1.161767135E−09 | −9.545853082E−11 | −3.772359694E−11 | 1.487162385E−11 |
| A24= | −2.741361641E−11 | 1.855156877E−12 | 5.533012593E−13 | −3.200710811E−13 |
| A26= | 2.777167906E−13 | −1.773823985E−14 | −4.752737320E−15 | 4.456236277E−15 |
| A28= | — | 5.155710601E−17 | 1.817567258E−17 | −3.624999091E−17 |
| A30= | — | — | — | 1.308937643E−19 |

In the 8th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.10 | ΣAT/(T56 + T78) | 1.62 |
| Fno | 1.98 | ImgH/BL | 5.88 |
| HFOV [deg.] | 44.7 | TL/ImgH | 1.25 |
| CRA_1.0Y [deg.] | 33.08 | f/|R1| + f/|R2| | 2.58 |
| V3 + V5 | 92.9 | f/|R3| + f/|R4| | 1.78 |
| V6 | 40.4 | f/|R5| + f/|R6| | 0.91 |
| Vmin | 12.4 | f/|R7| + f/|R8| | 0.94 |
| V1/V6 | 1.38 | f/|R9| + f/|R10| | 0.17 |
| V6/N6 | 25.95 | f/|R11| + f/|R12| | 1.60 |
| V6/(Vmax − Vmin) | 0.93 | f/|R13| + f/|R14| | 4.40 |
| Dr9r16/Dr1r8 | 2.13 | f/|R15| + f/|R16| | 3.01 |
| T78/T45 | 2.59 | |R16/R15| | 0.22 |
| T78/BL | 1.09 | |f7/f8| | 1.30 |
| ΣAT/T78 | 2.18 | — | — |

9th Embodiment

Figure 17:
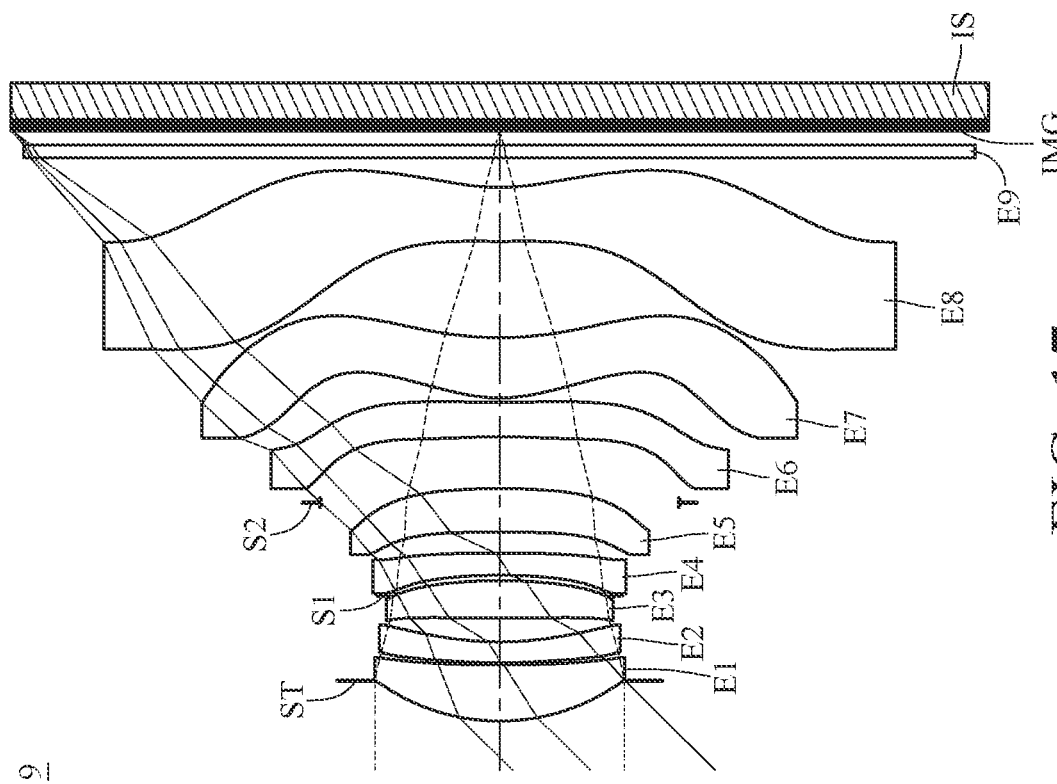
FIG. 17 is a schematic view of an image capturing unit according to the 9th embodiment of the present disclosure.
Figure 18:
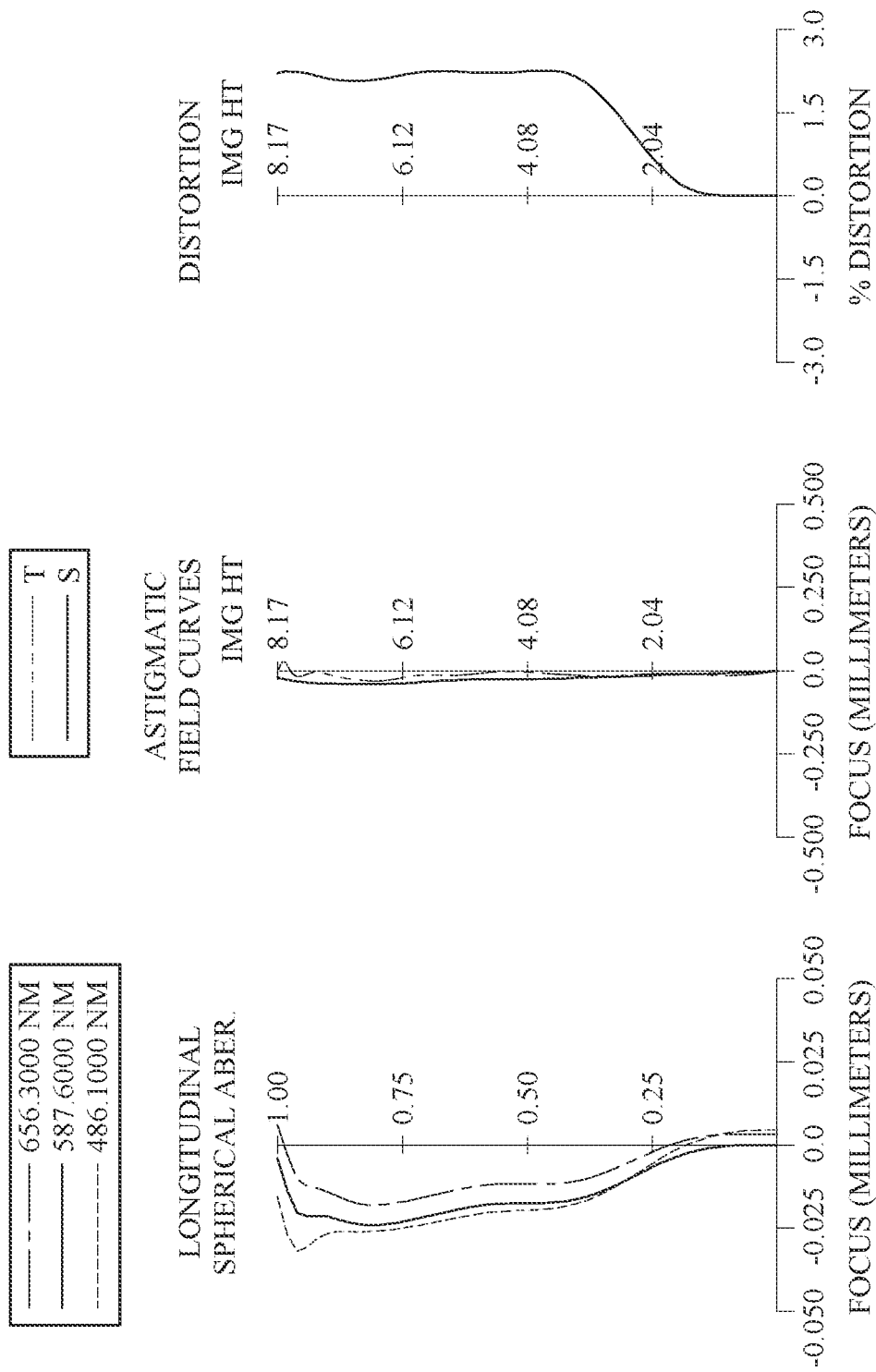
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the imaging optical lens system (its reference numeral is omitted) of the present disclosure and an image sensor IS. The imaging optical lens system includes, in order from an object side to an image side along an optical axis, an aperture stop ST, a first lens element E1, a second lens element E2, a third lens element E3, a stop S1, a fourth lens element E4, a fifth lens element E5, a stop S2, a sixth lens element E6, a seventh lens element E7, an eighth lens element E8, an IR-cut filter E9 and an image surface IMG. The imaging optical lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has at least one concave critical point in an off-axis region thereof. The image-side surface of the seventh lens element E7 has at least one convex critical point in an off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface MG, and will not affect the focal length of the imaging optical lens system. The image sensor IS is disposed on or near the image surface MG of the imaging optical lens system.

The detailed optical data of the 9th embodiment are shown in Table 17 and the aspheric surface data are shown in Table 18 below.

TABLE 17

9th Embodiment f = 7.91 mm, Fno = 1.89, HFOV = 45.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.678 | | | | |
| 2 | Lens 1 | 3.5158 | (ASP) | 0.945 | Plastic | 1.544 | 56.0 | 7.21 |
| 3 | | 30.8636 | (ASP) | 0.035 | | | | |
| 4 | Lens 2 | 12.7416 | (ASP) | 0.347 | Plastic | 1.584 | 28.2 | −15.57 |
| 5 | | 5.2543 | (ASP) | 0.404 | | | | |
| 6 | Lens 3 | 64.6260 | (ASP) | 0.625 | Plastic | 1.544 | 56.0 | 13.81 |
| 7 | | −8.4714 | (ASP) | −0.256 | | | | |
| 8 | Stop | Plano | | 0.345 | | | | |
| 9 | Lens 4 | −10.1290 | (ASP) | 0.368 | Plastic | 1.642 | 22.5 | −18.76 |
| 10 | | −64.8470 | (ASP) | 0.360 | | | | |
| 11 | Lens 5 | −26.4235 | (ASP) | 0.726 | Plastic | 1.544 | 56.0 | 42.07 |
| 12 | | −12.3823 | (ASP) | −0.234 | | | | |
| 13 | Stop | Plano | | 1.103 | | | | |
| 14 | Lens 6 | −9.5439 | (ASP) | 0.577 | Plastic | 1.566 | 37.4 | −11.42 |
| 15 | | 20.4435 | (ASP) | 0.075 | | | | |
| 16 | Lens 7 | 2.5136 | (ASP) | 1.010 | Plastic | 1.544 | 56.0 | 7.67 |
| 17 | | 5.4217 | (ASP) | 1.616 | | | | |
| 18 | Lens 8 | 33.3562 | (ASP) | 0.906 | Plastic | 1.544 | 56.0 | −7.14 |
| 19 | | 3.4472 | (ASP) | 0.500 | | | | |
| 20 | IR-cut filter | Plano | | 0.210 | Glass | 1.517 | 64.2 | — |
| 21 | | Plano | | 0.235 | | | | |
| 22 | Image | Plano | | 0.000 | | | | |

Note:
Reference wavelength is 587.6 nm (d-line).
An effective radius of the stop S1 (Surface 8) is 2.350 mm.
An effective radius of the stop S2 (Surface 13) is 3.650 mm.

TABLE 18

Aspheric Coefficients

| Surface # | 2 | 3 | 4 | 5 |
|---|---|---|---|---|
| k= | 0.000000000E+00 | 0.000000000E+00 | 0.000000000E+00 | 0.000000000E+00 |
| A4= | 4.833474221E−04 | 8.222878453E−03 | 1.211357884E−03 | −6.110879508E−03 |
| A6= | −5.833645306E−05 | −4.637331582E−03 | −1.872337202E−03 | 2.990649388E−04 |
| A8= | 3.367188475E−04 | 9.593512132E−04 | −3.222737467E−03 | −1.626808597E−03 |
| A10= | −4.122028760E−04 | 1.337950731E−03 | 6.040054708E−03 | 2.630676028E−03 |
| A12= | 2.493960493E−04 | −1.329351662E−03 | −4.435889457E−03 | −2.148195913E−03 |
| A14= | −8.418738395E−05 | 5.778944816E−04 | 1.829938218E−03 | 9.965378465E−04 |
| A16= | 1.566495950E−05 | −1.395293433E−04 | −4.408484179E−04 | −2.646086388E−04 |
| A18= | −1.482495103E−06 | 1.837460967E−05 | 5.825149739E−05 | 3.734702559E−05 |

| Surface # | 6 | 7 | 9 | 10 |
|---|---|---|---|---|
| k= | 0.000000000E+00 | 0.000000000E+00 | 0.000000000E+00 | 0.000000000E+00 |
| A4= | −1.700147641E−03 | 6.122673320E−03 | 3.346771496E−03 | −2.327140727E−03 |
| A6= | 2.459472619E−05 | −1.650344913E−02 | −2.394456066E−02 | −8.952836165E−03 |
| A8= | −1.875487079E−03 | 1.567919248E−02 | 2.549287186E−02 | 7.967291161E−03 |
| A10= | 2.099503980E−03 | −1.003109717E−02 | −1.797500547E−02 | −4.204842138E−03 |
| A12= | −1.387884815E−03 | 3.843119105E−03 | 8.061031963E−03 | 1.323689043E−03 |
| A14= | 5.234365158E−04 | −8.552711266E−04 | −2.307785454E−03 | −2.238382365E−04 |
| A16= | −1.044597840E−04 | 1.016693502E−04 | 4.122988772E−04 | 1.280988089E−05 |
| A18= | 8.494926667E−06 | −4.915447072E−06 | −4.140784561E−05 | 1.635383340E−06 |
| A20= | — | — | 1.735074836E−06 | −2.152564371E−07 |

| Surface # | 11 | 12 | 14 | 15 |
|---|---|---|---|---|
| k= | 0.000000000E+00 | 0.000000000E+00 | 0.000000000E+00 | 0.000000000E+00 |
| A4= | −4.216250163E−03 | 6.864401590E−04 | 4.486675039E−02 | −1.966912271E−02 |
| A6= | −6.147104715E−03 | −1.113744338E−02 | −3.264189879E−02 | 5.126555403E−03 |
| A8= | 2.260705152E−05 | 1.168241747E−02 | 2.042208437E−02 | 1.198869297E−03 |
| A10= | 5.507752254E−03 | −1.208569377E−02 | −1.052410058E−02 | −1.972617901E−03 |
| A12= | −6.811608233E−03 | 9.306896774E−03 | 4.062397766E−03 | 9.245001976E−04 |
| A14= | 4.497387231E−03 | −4.974804734E−03 | −1.158167401E−03 | −2.564940371E−04 |
| A16= | −1.858073545E−03 | 1.827128273E−03 | 2.433259220E−04 | 4.733653851E−05 |
| A18= | 4.927244227E−04 | −4.584979536E−04 | −3.748559657E−05 | −6.005374224E−06 |
| A20= | −8.154540624E−05 | 7.710901883E−05 | 4.179152198E−06 | 5.252836777E−07 |
| A22= | 7.672405030E−06 | −8.299434720E−06 | −3.280307986E−07 | −3.108662844E−08 |
| A24= | −3.129626303E−07 | 5.159979498E−07 | 1.717920672E−08 | 1.187144716E−09 |

TABLE 18-continued

| Aspheric Coefficients | | | | |
|---|---|---|---|---|
| A26= | — | −1.407062086E−08 | −5.378656489E−10 | −2.637412729E−11 |
| A28= | — | — | 7.593643896E−12 | 2.587477439E−13 |

| Surface # | 16 | 17 | 18 | 19 |
|---|---|---|---|---|
| k= | −1.000000000E+00 | 0.000000000E+00 | 0.000000000E+00 | −1.000000000E+00 |
| A4= | −6.033655591E−02 | −6.617549147E−03 | −3.817868830E−02 | −4.112910159E−02 |
| A6= | 2.582406748E−02 | 1.474607468E−03 | 9.726371756E−03 | 9.729786910E−03 |
| A8= | −9.815523354E−03 | −9.067324679E−04 | −2.114268026E−03 | −1.804113851E−03 |
| A10= | 2.679661638E−03 | 2.790493715E−04 | 3.071040557E−04 | 2.423875230E−04 |
| A12= | −5.234803945E−04 | −5.564647488E−05 | −2.828045816E−05 | −2.388426658E−05 |
| A14= | 7.255846721E−05 | 7.684996274E−06 | 1.648231362E−06 | 1.739216937E−06 |
| A16= | −7.088298823E−06 | −7.531253651E−07 | −5.721697272E−08 | −9.382883540E−08 |
| A18= | 4.821309753E−07 | 5.277011502E−08 | 8.096726614E−10 | 3.749470769E−09 |
| A20= | −2.224756268E−08 | −2.626913465E−09 | 2.123085905E−11 | −1.104206420E−10 |
| A22= | 6.617951144E−10 | 9.073642012E−11 | −1.339883732E−12 | 2.363776508E−12 |
| A24= | −1.142082373E−11 | −2.066575348E−12 | 3.016906311E−14 | −3.576213404E−14 |
| A26= | 8.672867355E−14 | 2.788240794E−14 | −3.381434826E−16 | 3.623977006E−16 |
| A28= | — | −1.685613425E−16 | 1.566737240E−18 | −2.206582657E−18 |
| A30= | — | — | — | 6.101720398E−21 |

In the 9th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 7.91 | ΣAT/(T56 + T78) | 1.39 |
| Fno | 1.89 | ImgH/BL | 8.64 |
| HFOV [deg.] | 45.4 | TL/ImgH | 1.21 |
| CRA_1.0Y [deg.] | 45.82 | f/|R1| + f/|R2| | 2.50 |
| V3 + V5 | 112.0 | f/|R3| + f/|R4| | 2.12 |
| V6 | 37.4 | f/|R5| + f/|R6| | 1.06 |
| Vmin | 22.5 | f/|R7| + f/|R8| | 0.90 |
| V1/V6 | 1.50 | f/|R9| + f/|R10| | 0.94 |
| V6/N6 | 23.91 | f/|R11| + f/|R12| | 1.21 |
| V6/(Vmax − Vmin) | 1.12 | f/|R13| + f/|R14| | 4.60 |
| Dr9r16/Dr1r8 | 2.05 | f/|R15| + f/|R16| | 2.53 |
| T78/T45 | 4.49 | |R16/R15| | 0.10 |
| T78/BL | 1.71 | |f7/f8| | 1.07 |
| ΣAT/T78 | 2.13 | — | — |

10th Embodiment

Figure 19:
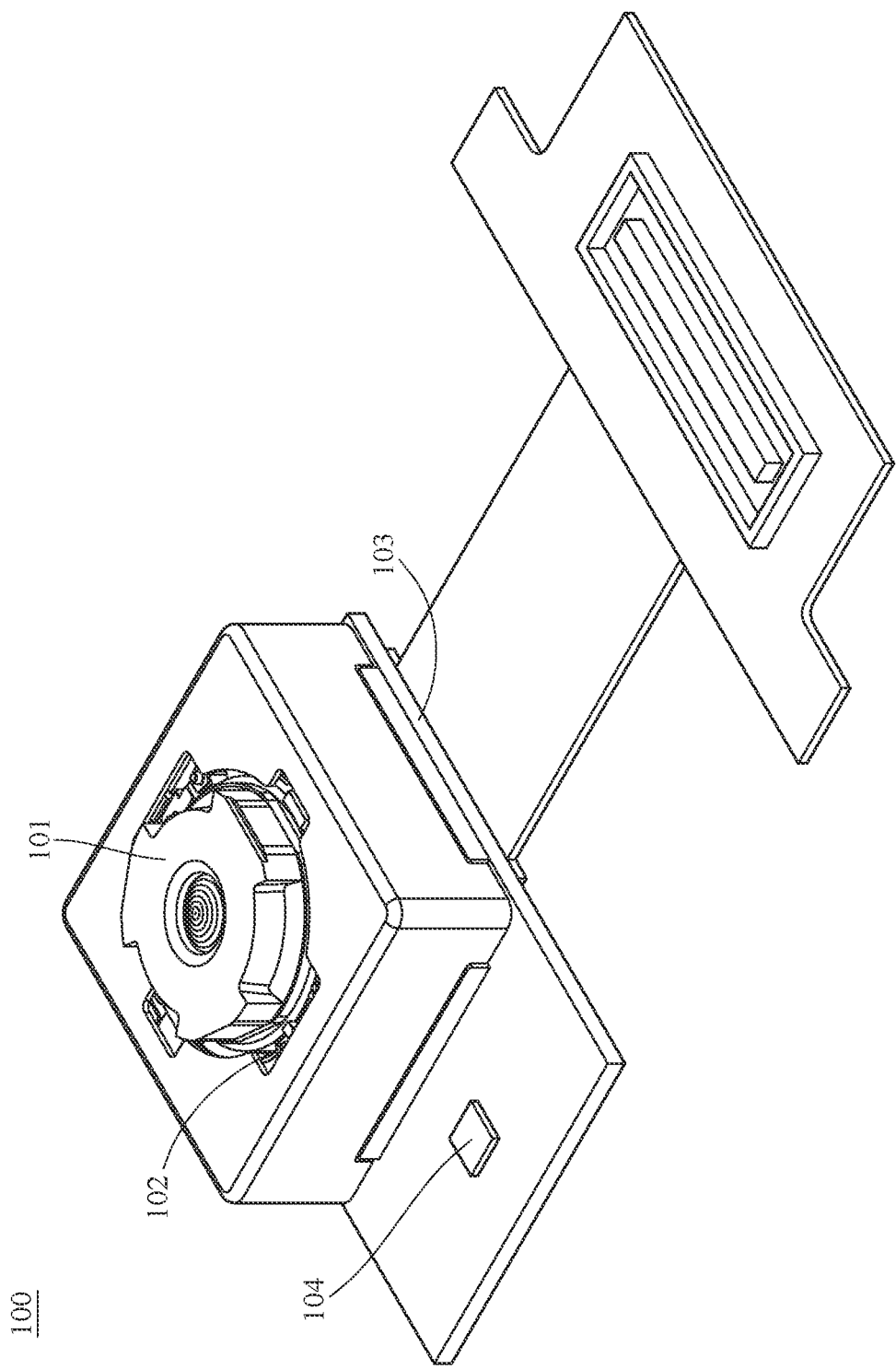
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 100 is a camera module including a lens unit 101, a driving device 102, an image sensor 103 and an image stabilizer 104. The lens unit 101 includes the imaging optical lens system disclosed in the 1st embodiment, a barrel and a holder member (their reference numerals are omitted) for holding the imaging optical lens system. However, the lens unit 101 may alternatively be provided with the imaging optical lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the imaging optical lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

11th Embodiment

Figure 20:
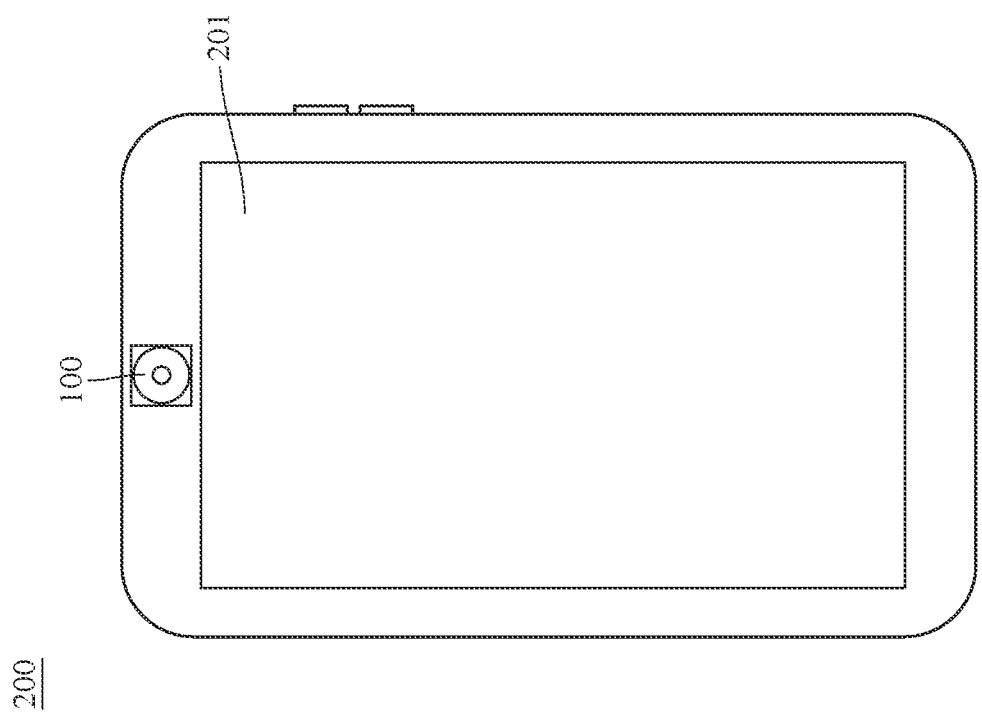
FIG. 20 is one perspective view of an electronic device according to the 11th embodiment of the present disclosure.

FIG. 20 is one perspective view of an electronic device according to the 11th embodiment of the present disclosure.

In this embodiment, an electronic device 200 is a smartphone including the image capturing unit 100 disclosed in the 10th embodiment and a display module 201. In FIG. 20, the image capturing unit 100 is a normal image capturing unit, and the image capturing unit 100 and the display module 201 are disposed on the same side of the electronic device 200, such that the image capturing unit 100 can be a front-facing camera of the electronic device 200 for taking selfies, but the present disclosure is not limited thereto. In this embodiment, the electronic device 200 includes a single image capturing unit 100, but the present disclosure is not limited to the number of image capturing units.

12th Embodiment

Figure 21:
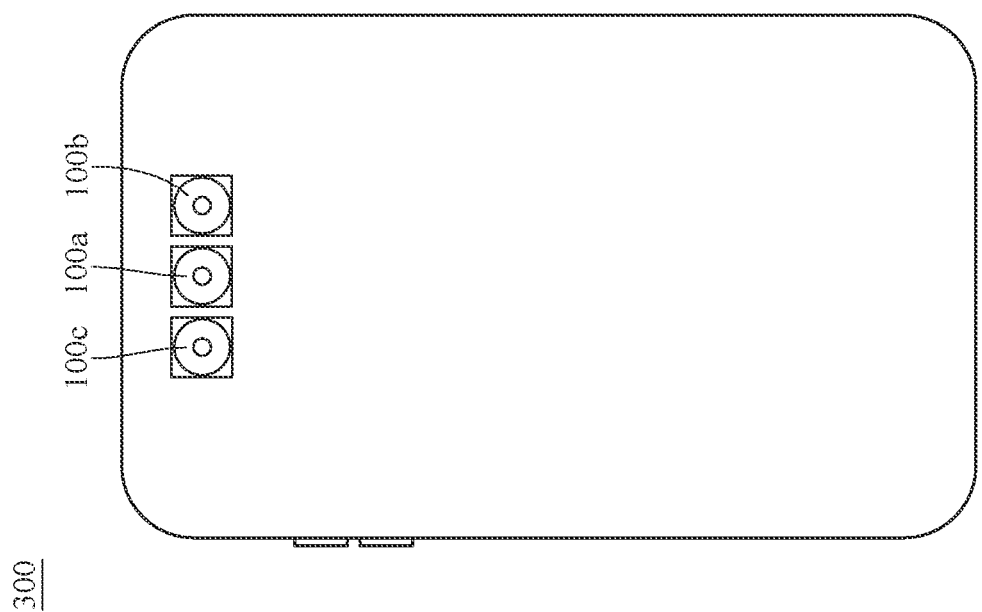
FIG. 21 is one perspective view of an electronic device according to the 12th embodiment of the present disclosure.

FIG. 21 is one perspective view of an electronic device according to the 12th embodiment of the present disclosure.

In this embodiment, an electronic device 300 is a smartphone including an image capturing unit 100a, an image capturing unit 100b, an image capturing unit 100c and a display module (not shown in the figure). The image capturing unit 100a includes the imaging optical lens system disclosed in the 4th embodiment. In FIG. 21, the image capturing units 100a, 100b and 100c are disposed on the same side of the electronic device 300, and the display module is disposed on another side of the electronic device 300.

The image capturing unit 100a is a normal image capturing unit, the image capturing unit 100b is a wide-angle image capturing unit and the image capturing unit 100c is a telephoto image capturing unit. Moreover, a maximum field of view of the image capturing unit 100c can range between 15 and 45 degrees. In this embodiment, the image capturing units 100a, 100b and 100c have different fields of view, such that the electronic device 300 has various magnification ratios so as to meet the requirement of optical zoom functionality. Moreover, a maximum field of view of the image capturing unit 100a and a maximum field of view of one of the image capturing units 100b and 100c can differ by at least 20 degrees. Therefore, it is favorable for the electronic device 300 to capture images of different fields of view for various applications. Moreover, the maximum field of view of the image capturing unit 100a and the maximum field of view of one of the image capturing units 100b and 100c can also differ by at least 30 degrees, at least 40 degrees or at least 60 degrees. The electronic device 300 includes multiple image capturing units 100a, 100b and 100c, but the present disclosure is not limited to the number and arrangement of image capturing units.

13th Embodiment

Figure 22:
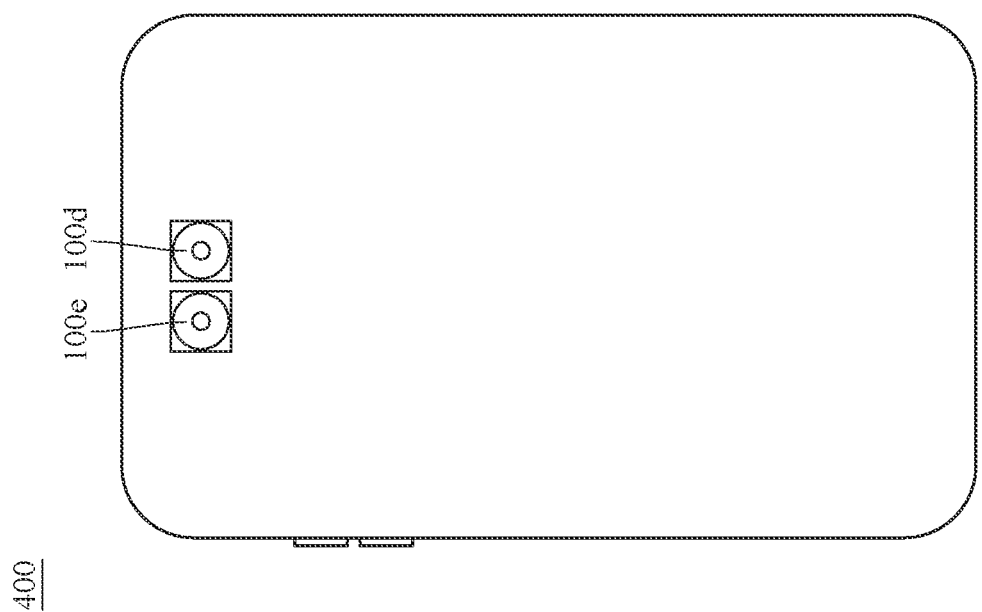
FIG. 22 is one perspective view of an electronic device according to the 13th embodiment of the present disclosure.

FIG. 22 is one perspective view of an electronic device according to the 13th embodiment of the present disclosure.

In this embodiment, an electronic device 400 is a smartphone including an image capturing unit 100d, an image capturing unit 100e and a display module (not shown in the figure). The image capturing unit 100d includes the imaging optical lens system disclosed in the 4th embodiment. In FIG. 22, the image capturing units 100d and 100e are disposed on the same side of the electronic device 400, and the display module is disposed on another side of the electronic device 400.

The image capturing unit 100d is a normal image capturing unit and the image capturing unit 100e is a wide-angle image capturing unit. In this embodiment, the image capturing units 100d and 100e have different fields of view, such that the electronic device 400 has various magnification ratios so as to meet the requirement of optical zoom functionality. The electronic device 400 includes multiple image capturing units 100d and 100e, but the present disclosure is not limited to the number and arrangement of image capturing units.

14th Embodiment

Figure 23:
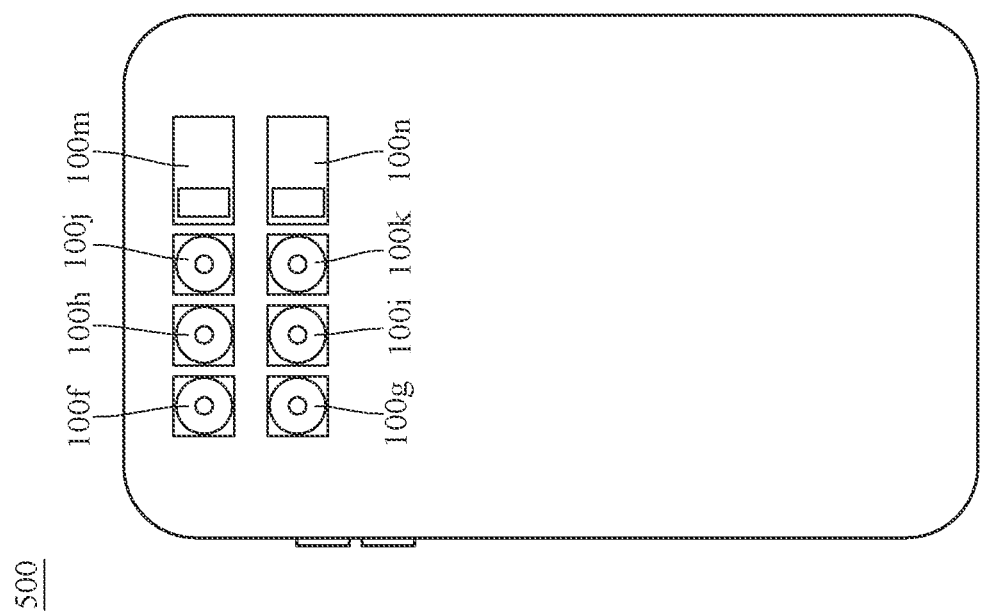
FIG. 23 is one perspective view of an electronic device according to the 14th embodiment of the present disclosure.

FIG. 23 is one perspective view of an electronic device according to the 14th embodiment of the present disclosure.

In this embodiment, an electronic device 500 is a smartphone including an image capturing unit 100f, an image capturing unit 100g, an image capturing unit 100h, an image capturing unit 100i, an image capturing unit 100j, an image capturing unit 100k, an image capturing unit 100m, an image capturing unit 100n and a display module (not shown in the figure). The image capturing units 100f, 100g, 100h, 100i, 100j, 100k, 100m, 100n are disposed on the same side of the electronic device 500, and the display module is disposed on another side of the electronic device 500. In addition, the image capturing unit 100h or 100i includes the imaging optical lens system disclosed in the 4th embodiment.

The image capturing units 100f and 100g are wide-angle image capturing units, the image capturing units 100h, 100i are normal image capturing units, the image capturing units 100j, 100k are telephoto image capturing units, and the image capturing units 100m, 100n are telephoto image capturing units configured with light-folding element(s). The image capturing units 100m, 100n with light-folding element(s) may respectively have a configuration, for example, similar to that as shown in FIG. 26, FIG. 27 or FIG. 28, and a description in this regard will not be provided again. In this embodiment, the image capturing units 100f, 100g, 100h, 100i, 100j, 100k, 100m, 100n have different fields of view, such that the electronic device 500 has various magnification ratios so as to meet the requirement of optical zoom functionality. The electronic device 500 includes multiple image capturing units 100f, 100g, 100h, 100i, 100j, 100k, 100m, 100n, but the present disclosure is not limited to the number and arrangement of image capturing units.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging optical lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element;

wherein the first lens element has positive refractive power, the second lens element has negative refractive power, the seventh lens element has an image-side surface being concave in a paraxial region thereof, and the image-side surface of the seventh lens element has at least one convex critical point in an off-axis region thereof;
wherein an Abbe number of the third lens element is V3, an Abbe number of the fifth lens element is V5, an Abbe number of the sixth lens element is V6, a focal length of the seventh lens element is f7, a focal length of the eighth lens element is f8, a curvature radius of an object-side surface of the eighth lens element is R15, a curvature radius of an image-side surface of the eighth lens element is R16, and the following conditions are satisfied:

30<V6<50;

85<V3+V5;

|f7/f8|<25; and

|R16/R15|<1.60.

2. The imaging optical lens system of claim 1, wherein an Abbe number of the first lens element is V1, the Abbe number of the sixth lens element is V6, and the following condition is satisfied:

1.35<V1/V6<1.95.

3. The imaging optical lens system of claim 1, wherein a sum of axial distances between each of all adjacent lens elements of the imaging optical lens system is ΣAT, an axial distance between the seventh lens element and the eighth lens element is T78, and the following condition is satisfied:

ΣAT/T78<2.50.

4. The imaging optical lens system of claim 1, wherein a maximum image height of the imaging optical lens system is ImgH, an axial distance between the image-side surface of the eighth lens element and an image surface is BL, and the following condition is satisfied:

5.2<ImgH/BL.

5. The imaging optical lens system of claim 1, wherein an axial distance between an object-side surface of the first lens element and an image-side surface of the fourth lens element is Dr1r8, an axial distance between an object-side surface of the fifth lens element and the image-side surface of the eighth lens element is Dr9r16, and the following condition is satisfied:

1.75<Dr9r16/Dr1r8.

6. The imaging optical lens system of claim 1, wherein an axial distance between the seventh lens element and the eighth lens element is T78, an axial distance between the image-side surface of the eighth lens element and an image surface is BL, and the following condition is satisfied:

0.95<T78/BL.

7. The imaging optical lens system of claim 1, wherein the Abbe number of the sixth lens element is V6, a refractive index of the sixth lens element is N6, and the following condition is satisfied:

19<V6/N6<29.

8. The imaging optical lens system of claim 1, wherein the sixth lens element has negative refractive power, the seventh lens element has positive refractive power, the eighth lens element has negative refractive power, the seventh lens element has an object-side surface being convex in a paraxial region thereof, and the object-side surface of the seventh lens element has at least one concave critical point in an off-axis region thereof.

9. The imaging optical lens system of claim 1, wherein the Abbe number of the sixth lens element is V6, a maximum value among Abbe numbers of all lens elements of the imaging optical lens system is Vmax, a minimum value among Abbe numbers of all lens elements of the imaging optical lens system is Vmin, and the following condition is satisfied:

0.75<V6/(Vmax-Vmin)<1.5.

10. The imaging optical lens system of claim 1, wherein a focal length of the imaging optical lens system is f, a curvature radius of an object-side surface of one lens element of the imaging optical lens system is Ro, a curvature radius of an image-side surface of the said lens element is Ri, and at least one lens element of the imaging optical lens system satisfies the following condition:

f/|Ro|+f/|Ri|<0.80.

11. The imaging optical lens system of claim 1, wherein the curvature radius of the object-side surface of the eighth lens element is R15, the curvature radius of the image-side surface of the eighth lens element is R16, and the following condition is satisfied:

|R16/R15|<1.0.

12. The imaging optical lens system of claim 1, wherein an axial distance between an object-side surface of the first lens element and an image surface is TL, a maximum image height of the imaging optical lens system is ImgH, an f-number of the imaging optical lens system is Fno, and the following conditions are satisfied:

TL/ImgH<1.40; and 1.20<Fno<2.20.

13. The imaging optical lens system of claim 1, wherein a chief ray angle at a maximum image height of the imaging optical lens system is CRA_1.0Y, and the following condition is satisfied:

40[deg.]<CRA_1.0Y<65[deg.].

14. The imaging optical lens system of claim 1, wherein a minimum value among Abbe numbers of all lens elements of the imaging optical lens system is Vmin, and the following condition is satisfied:

Vmin<20.

15. The imaging optical lens system of claim 1, wherein a sum of axial distances between each of all adjacent lens elements of the imaging optical lens system is ΣAT, an axial distance between the fifth lens element and the sixth lens element is T56, an axial distance between the seventh lens element and the eighth lens element is T78, and the following condition is satisfied:

ΣAT/(T56+T78)<2.0.

16. An image capturing unit, comprising:
the imaging optical lens system of claim 1; and
an image sensor disposed on an image surface of the imaging optical lens system.

17. An electronic device, comprising at least two image capturing units disposed on a same side of the electronic device, and the image capturing units comprising:
- a first image capturing unit, comprising the imaging optical lens system of claim 1 and an image sensor disposed on an image surface of the imaging optical lens system; and
- a second image capturing unit, comprising an optical lens assembly and an image sensor disposed on an image surface of the optical lens assembly;
- wherein a maximum field of view of the first image capturing unit and a maximum field of view of the second image capturing unit differ by at least 20 degrees.

18. The imaging optical lens system of claim 1,
wherein the focal length of the seventh lens element is f7, the focal length of the eighth lens element is f8, an axial distance between the fourth lens element and the fifth lens element is T45, an axial distance between the seventh lens element and the eighth lens element is T78, and the following conditions are satisfied:

$|f7/f8|<25;$ and $|R16/R15|<1.60.$

19. The imaging optical lens system of claim 1, wherein the following condition is satisfied:

$|f7/f8|<2.0.$

20. The imaging optical lens system of claim 1, wherein an axial distance between the fourth lens element and the fifth lens element is T45, an axial distance between the seventh lens element and the eighth lens element is T78, and the following condition is satisfied:

$T78/T45<4.0.$

21. The electronic device of claim 17, wherein the maximum field of view of the first image capturing unit and the maximum field of view of the second image capturing unit differ by at least 40 degrees.

* * * * *

UNITED STATES PATENT AND TRADEMARK OFFICE
CERTIFICATE OF CORRECTION

PATENT NO. : 12,174,349 B2  
APPLICATION NO. : 17/506391  
DATED : December 24, 2024  
INVENTOR(S) : Kuan-Ting Yeh et al.

Page 1 of 1

It is certified that error appears in the above-identified patent and that said Letters Patent is hereby corrected as shown below:

In the Claims

Column 58, Line 1 and 4 (Claim 18):
Delete:
"$|f7/f8| < 25$; and
$|R16/R15| < 1.60$."

And insert therefor:
--$|f7/f8| < 4.0$; and
$T78/T45 < 5.0$.--

Signed and Sealed this  
Eleventh Day of February, 2025

Coke Morgan Stewart  
*Acting Director of the United States Patent and Trademark Office*